(12) United States Patent
Opsenica et al.

(10) Patent No.: US 12,003,511 B2
(45) Date of Patent: Jun. 4, 2024

(54) RESOURCE PROVISION FOR MOBILE ENTITIES

(71) Applicant: Telefonaktiebolaget LM Ericsson (publ), Stockholm (SE)

(72) Inventors: Miljenko Opsenica, Espoo (FI); Patrik Salmela, Espoo (FI); Roberto Morabito, Helsinki (FI); Edgar Ramos, Kirkkonummi (FI); Tero Kauppinen, Espoo (FI); Miika Komu, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 278 days.

(21) Appl. No.: 17/607,152

(22) PCT Filed: Apr. 30, 2019

(86) PCT No.: PCT/EP2019/061124
§ 371 (c)(1),
(2) Date: Oct. 28, 2021

(87) PCT Pub. No.: WO2020/221449
PCT Pub. Date: Nov. 5, 2020

(65) Prior Publication Data
US 2022/0210160 A1 Jun. 30, 2022

(51) Int. Cl.
*H04L 9/40* (2022.01)
*H04L 12/06* (2006.01)
(Continued)

(52) U.S. Cl.
CPC ............ *H04L 63/102* (2013.01); *H04L 12/06* (2013.01); *H04L 47/82* (2013.01);
(Continued)

(58) Field of Classification Search
None
See application file for complete search history.

(56) References Cited

U.S. PATENT DOCUMENTS

| | | | | |
|---|---|---|---|---|
| 2006/0225132 A1* | 10/2006 | Swift | ...................... | G06F 21/33 726/11 |
| 2014/0244834 A1* | 8/2014 | Guedalia | ................. | H04W 4/08 709/224 |
| 2019/0014117 A1 | 1/2019 | Li et al. | | |

FOREIGN PATENT DOCUMENTS

| | | |
|---|---|---|
| WO | 2017/184131 A1 | 10/2017 |
| WO | 2018/044282 A1 | 3/2018 |

OTHER PUBLICATIONS

International Search Report and Written Opinion issued in International Application No. PCT/EP2019/061124 dated Dec. 12, 2019 (10 pages).

* cited by examiner

*Primary Examiner* — William J. Goodchild
(74) *Attorney, Agent, or Firm* — Rothwell, Figg, Ernst & Manbeck, P.C.

(57) ABSTRACT

A method for operating a system hosted on a mobile entity is disclosed, wherein the system is operable to connect to a communication network. The method, performed by a controller of the system, comprises seeking to establish a trust relationship with a cooperating system hosted on a mobile entity, and, if a trust relationship with the cooperating system is established, performing at least one of: initiating use of a resource provided by the cooperating system, or initiating provision of a resource for use by the cooperating system. Also disclosed is a method for operating a function comprising a digital representative of a system hosted on a mobile entity, wherein the system is operable to connect to a communication network. The method, performed by the (Continued)

function, comprises negotiating, with a digital representative of a cooperating system hosted on a mobile entity, at least one of provision of a resource to the system by the cooperating system, or provision of a resource to the cooperating system by the system.

18 Claims, 23 Drawing Sheets

(51) Int. Cl.
    *H04L 47/70*         (2022.01)
    *H04L 67/1061*     (2022.01)
    *H04W 12/30*       (2021.01)
    *H04W 12/63*       (2021.01)

(52) U.S. Cl.
    CPC ......... *H04L 67/1068* (2013.01); *H04W 12/30* (2021.01); *H04W 12/63* (2021.01)

RESOURCE PROVISION FOR MOBILE ENTITIES

CROSS REFERENCE TO RELATED APPLICATION

This application is a 35 U.S.C. § 371 National Stage of International Patent Application No. PCT/EP2019/061124, filed Apr. 30, 2019.

TECHNICAL FIELD

The present disclosure relates to a method for operating a system hosted on a mobile entity, wherein the system is operable to connect to a communication network. The present disclosure also relates to a method for operating a function comprising a digital representative of a system hosted on a mobile entity, wherein the system is operable to connect to a communication network. The present disclosure also relates to a controller, an apparatus and to a computer program and a computer program product configured, when run on a computer to carry out methods for operating a system hosted on a mobile entity and a function comprising a digital representative of a system hosted on a mobile entity.

BACKGROUND

The edge cloud paradigm proposes to bring computing and storage capacity closer to end users. Functionality is distributed to edge devices, enabling processing to take place closer to where data is generated and used. Propositions are also being generated for autonomous constrained edge clouds, in which one or more of the edge devices experience some form of constraint, on network connectivity, storage capacity, processing capacity etc. One example application of constrained edge cloud is in the transport industry. Transportation entities including shipping vessels, heavy goods vehicles, transportation containers, etc. have all been subject to varying levels of automation and digitisation, with systems automation, remote control and the development of fully autonomous transportation entities being major drivers in an ongoing revolution within the transport industry. This evolution of transportation entities and services has highlighted the need for connectivity, data exchange, security and intelligence in transportation entities, as well as generating opportunities for additional services not necessarily related to autonomy of transportation entities.

Transportation entities typically comprise a plurality of components and systems which may be supplied by different vendors and managed by isolated vendor systems. Transportation edge systems are often constrained in terms of network connectivity and cloud resources. In such constrained edge systems, vendors are obliged to limit communication with the central cloud and management services, and any additional communication across local edge cloud services, owing to high cost or simply to unavailability of network connectivity. Limitation of communication across different transportation entities or systems provided by different vendors also constrains functionality and service provision. Related industry segments have traditionally operated with isolated vendor heterogeneity and strong limitation on data exchange across different vendors. Complex security and legislation limitations also represent challenges in exploiting the potential of edge cloud computing for entities in the transportation industries.

SUMMARY OF INVENTION

It is an aim of the present disclosure to provide a method, apparatus and computer readable medium which at least partially address one or more of the challenges discussed above.

According to a first aspect of the present disclosure, there is provided a method for operating a system hosted on a mobile entity, wherein the system is operable to connect to a communication network. The method, performed by a controller of the system, comprises seeking to establish a trust relationship with a cooperating system hosted on a mobile entity, and, if a trust relationship with the cooperating system is established, performing at least one of: initiating use of a resource provided by the cooperating system, or initiating provision of a resource for use by the cooperating system.

According to examples of the present disclosure, a cooperating system may comprise any other system with which the system can communicate. According to examples of the present disclosure, the mobile entity on which the system is hosted may be a physical entity that is subject to one or more constraints upon its resources. Such constraints may include limitations on connectivity with the communication network, data storage, processing capacity etc. The mobile entity may comprise an edge node of the communication network. Example mobile entities may comprise transportation entities such as ships, airplanes, trains, heavy goods vehicles, cars or other vehicles, autonomous vehicles, robots, laptop or tablet computers, mobile phones etc. The system may for example comprise a navigation system, weather monitoring system, engine monitoring system, inventory control system etc.

According to examples of the present disclosure, initiating use of a resource provided by the cooperating system or initiating provision of a resource for use by the cooperating system may comprise initiating use or provision of a resource in accordance with a transaction negotiated by digital representatives of the system and the cooperating system.

According to examples of the present disclosure, the resource provided by the cooperating system or the system may comprise at least one of: data, communication network connection bandwidth, processing capacity, data storage, and/or functionality of the mobile entity on which the cooperating system is hosted.

According to examples of the present disclosure, example resources may include weather data, map data, bandwidth for data transfer over the communication network, data storage capacity, computing capacity, positioning service connectivity, surface scanning radar, etc.

According to examples of the present disclosure, the system and cooperating system may be hosted on at least one of the same mobile entity, and/or different mobile entities.

According to examples of the present disclosure, seeking to establish a trust relationship with a cooperating system hosted on a mobile entity may comprise obtaining at least one of an identity of the cooperating system or a security credential of the cooperating system, and verifying the obtained identity or security credential.

According to examples of the present disclosure, the security credential may for example comprise a certificate which may be associated with an organisation. In some examples, the system may also be configured with a security credential in the form of a certificate, and verifying the security credential may comprise comparing the certificates. In some examples, certificate verification may be performed using asymmetric cryptography: verifying that the cooperating system owns the certificate/public key by having the cooperating system use the corresponding private key. In some examples, the issuer of the certificate can also be verified to be a trusted party. In such examples the trust is twofold; the ownership of the certificate is established (for example using a private key), and the issuer of the certificate is mapped to a trusted entity (for example a shipping company). In such examples, verification of a security credential may ensure compliance with a trust policy that specifies trust of any system having a certificate from particular certificate issuer, provided the system can establish that they own the certificate (for example using the corresponding private key).

According to examples of the present disclosure, seeking to establish a trust relationship with a cooperating system hosted on a mobile entity may further comprise providing an identity of the system or a security credential of the system to the cooperating system.

According to examples of the present disclosure, initiating use of a resource provided by the cooperating system or initiating provision of a resource for use by the cooperating system may comprise initiating use of a resource or initiating provision of a resource in accordance with a policy configured in the system and associated with the obtained identity or security credential of the cooperating system. According to examples of the present disclosure, the policy may be configured in the system controller or a memory accessible to the system controller. Some examples of the present disclosure may thus facilitate opportunistic sharing based on shared certificates and an encoded policy; the requesting system obtains a certificate from a providing system, checks that the certificate matches its own certificate (for example a shared certificate associated with their company or group), and on the basis of this certification can proceed to use resources provided by the providing system in accordance with the associated policy. Similarly, the providing system establishes that it may provide resources to the requesting system on the basis of a shared certificate.

According to examples of the present disclosure, verifying the obtained identity or security credential may comprise requesting verification of the obtained identity or security credential from a digital representative of the system, and receiving a verification response from the digital representative.

According to examples of the present disclosure, the response may be accompanied by a specification of resources provided by the cooperating system that the system is authorised to use or a specification of resources that the system is authorised to provide to the cooperating system.

According to examples of the present disclosure, verifying the obtained identity or security credential may comprise authenticating the obtained identity or security credential, and comparing the obtained identity or security credential to an identity or security credential specified in a transaction token. According to such examples of the present disclosure, a transaction token may comprise a specification of resource usage identifying at least: the system, a cooperating system, and resources provided by the cooperating system that may be used by the system or resources available to the system that may be provided to the cooperating system.

According to examples of the present disclosure, the token may comprise or be accompanied by additional information facilitating the use of resources specified in the transaction token, including for example anchoring points for connectivity etc.

According to examples of the present disclosure, the transaction token may further comprise a freshness parameter, and seeking to establish a trust relationship with a cooperating system hosted on a mobile entity may further comprise verifying the freshness parameter.

According to examples of the present disclosure, the method may further comprise receiving at least one transaction token, and verifying the received transaction token.

According to examples of the present disclosure, the transaction token may be received from a digital representative of the system or from the cooperating system, for example in a resource usage request.

According to examples of the present disclosure, verifying the received transaction token may comprise as least one of confirming that the received transaction token has been received over a communication channel established between the system and a digital representative of the system and/or verifying that the received transaction token has been authorised by a digital representative of the system.

According to examples of the present disclosure, the transaction token may be authorised by a digital representative of the system through digital signature of the token or particular parts of the token.

According to examples of the present disclosure, verifying that the received transaction token has been authorised by a digital representative of the system may comprise at least one of: decrypting the received transaction token using a security credential associated with the digital representative of the system, and/or confirming that the received transaction token has been signed by a security credential associated with the digital representative of the system. According to examples of the present disclosure, both the system and cooperating system may be required to be able to inspect the content of the token. If the token has been encrypted by a digital representative, the system whose digital representative has encrypted the token may be able to decrypt it. That system may then share the decrypted token with the other system.

According to examples of the present disclosure, the method may further comprise detecting the presence of the cooperating system, and establishing connectivity with the cooperating system.

According to examples of the present disclosure, detecting the presence of the cooperating system and establishing connectivity may be performed by any appropriate means (broadcast over short range/long range radio etc.).

According to examples of the present disclosure, the method may further comprise sending a resource usage request to the cooperating system on establishment of a trust relationship.

According to examples of the present disclosure, the method may further comprise including with the resource usage request a transaction token in which the cooperating system is identified.

According to examples of the present disclosure, the request may further comprise additional information including configuration information for the use of resources, metadata etc. The request may indicate that the system is seeking to initiate use of resources provided by the cooperating system, or that the system is seeking to initiate provision of resources to the cooperating system (for example if a transaction has been negotiated by digital representatives without initiation by the cooperating system).

According to examples of the present disclosure, the method may further comprise receiving a resource usage request from the cooperating system on establishment of a trust relationship, and validating the resource usage request, for example using a transaction token either received with the request or received from the digital representative of the system.

According to examples of the present disclosure, the method may further comprise detecting a requirement for external provision of resources, and assembling a resource requirement specification.

According to examples of the present disclosure, in the context of the resource provision in the present disclose, "external" may comprise external to those resources directly available to the system (such resources may be inherent to the system or hosted on the mobile entity and available to the system). Other resources hosted on the mobile entity may not be directly available to the system and so may be considered to be "external".

According to examples of the present disclosure, the method may further comprise sending the resource requirement specification to a digital representative of the system.

According to examples of the present disclosure, detecting a requirement for external provision of resources may comprise predicting a future requirement for the provision of external resources.

According to examples of the present disclosure, prediction may be on the basis of predictive algorithms using locally available data concerning mobility of the mobile entity, predicted path, predicted resource requirements etc.

According to examples of the present disclosure, the method may further comprise, responsive to initiating provision of a resource for use by the cooperating system, performing at least one of: receiving data from the cooperating system, storing the received data, and/or forwarding the received data to a digital representative of the system. The method may further comprise, responsive to initiating provision of a resource for use by the cooperating system, receiving and performing a task. The task may comprise a computing task, for example on the basis of data received from the cooperating system, displaying information etc. The method may further comprise providing a result of the performed task to at least one of the cooperating system or the digital representative of the system, for example for forwarding to the digital representative of the cooperating system or to a central repository or function.

According to examples of the present disclosure, the digital representative of the system may comprise a virtualised function configured with information about the system.

According to examples of the present disclosure, the digital representative may be configured with processes for monitoring operation of the system, for example on the basis of operational data for the system provided by the system controller. The digital representative may be further configured with predictive models for anticipating the operational requirements of the system. Such operational requirements may comprise data requirements, network connectivity requirements for the sending or receiving of data or control information, processing requirements such as computation, data storage requirements, or any other examples of operational requirements. The system and digital representative may be mutually authenticated, for example using a shared secret or other security credentials According to another aspect of the present disclosure, there is provided a method for operating a function comprising a digital representative of a system hosted on a mobile entity, wherein the system is operable to connect to a communication network. The method, performed by the function, comprises negotiating, with a digital representative of a cooperating system hosted on a mobile entity, at least one of: provision of a resource to the system by the cooperating system, and/or provision of a resource to the cooperating system by the system.

According to examples of the present disclosure, the digital representative of the system may be configured with information about the system.

According to examples of the present disclosure, the digital representative may be configured with processes for monitoring operation of the first system, for example on the basis of operational data for the system provided by the system controller. The digital representative may be further configured with predictive models for anticipating the operational requirements of the system.

According to examples of the present disclosure, the method may further comprise facilitating provision to the system of information about the negotiated provision of resource. According to examples of the present disclosure, this may comprise sending information about the negotiated provision of resource directly to the system, or sending the information to the digital representative of the cooperating system for delivery to the system via the cooperating system.

According to examples of the present disclosure, the method may further comprise enrolling the system with a trust management system based on a repository of enrolled systems.

According to examples of the present disclosure, the repository of enrolled systems may be a distributed repository.

According to examples of the present disclosure, the distributed repository may comprise a distributed ledger, and the trust management system may in some examples be implemented in a blockchain system. The repository may alternatively comprise a centralised repository such as a database.

According to examples of the present disclosure, enrolling the system with a trust management system may comprise providing information about the resources available for provision by the system.

According to examples of the present disclosure, enrolling the system with a trust management system may comprise establishing a smart contract for provision of resources by the system.

According to examples of the present disclosure, the method may further comprise establishing a smart contract for provision of resources by the system.

According to examples of the present disclosure, the smart contract may be established within the framework of the trust management system.

According to examples of the present disclosure, a smart contract may comprise a framework in which individual transactions may take a place in a blockchain related trusted channel at any point in time after the smart contract is established.

According to examples of the present disclosure, the method may further comprise identifying the cooperating system hosted on a mobile entity for provision of a resource to the system.

According to examples of the present disclosure, identifying the cooperating system hosted on a mobile entity for provision of a resource to the system may comprise querying a repository of potential cooperating systems.

According to examples of the present disclosure, the repository of potential cooperating systems may contain systems enrolled in a trust management system.

According to examples of the present disclosure, the repository of potential cooperating systems may be centralised or distributed, for example based on a distributed ledger etc.

According to examples of the present disclosure, the method may further comprise establishing resource requirements for the system.

According to examples of the present disclosure, establishing resource requirements for the system may comprise at least one of: receiving a specification of resource requirements from the system and/or predicting resource requirements for the system based on data available to the function.

According to examples of the present disclosure, querying a repository of potential cooperating systems may comprise including the established resource requirements with the query.

According to examples of the present disclosure, the query may additionally specify a geographical location within which the required resources should be provided and/or a time period within which the required resources should be provided.

According to examples of the present disclosure, identifying the cooperating system hosted on a mobile entity for provision of a resource to the system may further comprise receiving from the repository an identification of cooperating systems operable to provide resources.

According to examples of the present disclosure, the identified cooperating systems may be operable to provide the required resources specified in the query.

According to examples of the present disclosure, identifying the cooperating system hosted on a mobile entity for provision of a resource to the system may further comprise receiving from the repository at least one of: one or more contracts for resource provision established with the identified cooperating systems, and/or policies for resource provision associated with the identified cooperating systems.

According to examples of the present disclosure, identifying the cooperating system hosted on a mobile entity for provision of a resource to the system may further comprise selecting from among the identified cooperating systems operable to provide resources a target cooperating system.

According to examples of the present disclosure, the target cooperating system may be selected on the basis of a best match between resources that the cooperating systems may provide and the resource requirements of the system. Selection may take into account already existing contracts, so preferring amongst cooperating systems with a similar match between resources offered and resource requirements, a cooperating system for which a contract already exists.

According to examples of the present disclosure, negotiating, with a digital representative of a cooperating system hosted on a mobile entity, at least one of: provision of a resource to the system by the cooperating system, or provision of a resource to the cooperating system by the system may comprise establishing a contract for resource provision.

According to examples of the present disclosure, negotiating, with a digital representative of a cooperating system hosted on a mobile entity, provision of a resource to the system by the cooperating system may comprise requesting a transaction comprising provision of an identified resource by the cooperating system.

According to examples of the present disclosure, the cooperating system may be the target cooperating system identified according to the preceding examples. The transaction request may be addressed to the repository of potential cooperating systems or alternatively may be addressed directly to the digital representative of the (target) cooperating system. Included in the transaction request may be resource usage details such as data for transfer, resource to be provided, time, route, policy details, connectivity parameters etc. The transaction may be requested within the context of an established (smart) contract for the provision of resources by the cooperating system.

According to examples of the present disclosure, negotiating, with a digital representative of a cooperating system hosted on a mobile entity, provision of a resource to the system by the cooperating system may further comprise receiving a transaction request response.

According to examples of the present disclosure, the transaction request response may be received from the repository of potential cooperating systems or directly from the digital representative of the cooperating system.

According to examples of the present disclosure, the transaction request response may comprise at least one of: connectivity data for establishing connectivity with the cooperating system, information on resources of the cooperating system that may be provided by the cooperating system to the system, and/or a security credential of a digital representative of the cooperating system.

According to examples of the present disclosure, information for connectivity may be used by the system to establish connectivity with the cooperating system. According to examples of the present disclosure, a security credential of the digital representative of the cooperating system may be included in the transaction request response in case the cooperating system receives information about the transaction via the system rather than its own digital representative, so allowing the cooperating system to confirm that its digital representative has authorised the transaction.

According to examples of the present disclosure, negotiating, with a digital representative of a cooperating system hosted on a mobile entity, provision of a resource to the cooperating system by the system may comprise receiving a request for a transaction comprising provision of an identified resource to the cooperating system by the system, and validating the request.

According to examples of the present disclosure, the request may be received from the repository of potential cooperating systems or directly from the digital representative of the cooperating system.

According to examples of the present disclosure, validating the request may comprise establishing that: fulfilment of the request is in accordance with a policy, and fulfilment of the request is possible for the system.

According to examples of the present disclosure, negotiating, with a digital representative of a cooperating system hosted on a mobile entity, provision of a resource to the cooperating system by the system may further comprise sending a transaction request response in accordance with a result of the validation of the request.

According to examples of the present disclosure, the transaction request response may be sent to the repository or to the digital representative of the cooperating system.

According to examples of the present disclosure, the transaction request response may comprise at least one of: connectivity data for establishing connectivity with the system, information on resources of the system that may be provided to the cooperating system by the system and/or a security credential of the function.

According to examples of the present disclosure, the method may further comprise assembling a transaction token for at least one of: provision of a resource to the system by the cooperating system or provision of a resource to the cooperating system by the system.

According to examples of the present disclosure, the method may further comprise authorising the assembled transaction token.

According to examples of the present disclosure, authorising the assembled transaction token may comprise signing the token with a security credential of the function or by encrypting the token.

According to examples of the present disclosure, the transaction token may comprise information to facilitate at least one of: provision of a resource to the system by the cooperating system, or provision of a resource to the cooperating system by the system.

According to examples of the present disclosure, examples of the information may comprise: a specification of resources to be provided/used, identification of the cooperating system, a security credential of the cooperating system, a freshness parameter such as a time stamp or sequence number, connectivity data etc.

According to examples of the present disclosure, the transaction token may further comprise a security credential of the digital representative of the cooperating system.

According to examples of the present disclosure, the method may further comprise providing the transaction token to at least one of: the system, and/or the digital representative of the cooperating system.

According to examples of the present disclosure, the method may further comprise receiving data from the digital representative of the cooperating system, the data originating from the system.

According to examples of the present disclosure, the method may further comprise receiving data from the system, the data originating from the cooperating system.

According to examples of the present disclosure, the method may further comprise forwarding the received data to at least one of the digital representative of the cooperating system or a data aggregation function. The data aggregation function may be centralised or distributed, and may be hosted in the cloud.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a controller for a system hosted on a mobile entity, wherein the system is operable to connect to a communication network. The controller comprises a processor and a memory, the memory containing instructions executable by the processor such that the controller is operable to: seek to establish a trust relationship with a cooperating system hosted on a mobile entity, and, if a trust relationship with the cooperating system is established, perform at least one of: initiating use of a resource provided by the cooperating system, or initiating provision of a resource for use by the cooperating system.

According to examples of the present disclosure, the controller may be further operable to carry out a method according to any one of the preceding aspects or examples of the present disclosure.

According to another aspect of the present disclosure, there is provided an apparatus for operating a function comprising a digital representative of a system hosted on a mobile entity, wherein the system is operable to connect to a communication network. The apparatus comprises a processor and a memory, the memory containing instructions executable by the processor such that the apparatus is operable to: negotiate, with a digital representative of a cooperating system hosted on a mobile entity, at least one of: provision of a resource to the system by the cooperating system; or provision of a resource to the cooperating system by the system.

According to examples of the present disclosure, the apparatus may be further operable to carry out a method according to any one of the preceding aspects or examples of the present disclosure.

According to another aspect of the present disclosure, there is provided a controller for a system hosted on a mobile entity, wherein the system is operable to connect to a communication network. The controller is adapted to seek to establish a trust relationship with a cooperating system hosted on a mobile entity, and, if a trust relationship with the cooperating system is established, perform at least one of: initiating use of a resource provided by the cooperating system, or initiating provision of a resource for use by the cooperating system.

According to examples of the present disclosure, the controller may be further adapted to carry out a method according to any one of the preceding aspects or examples of the present disclosure.

According to another aspect of the present disclosure, there is provided an apparatus for operating a function comprising a digital representative of a system hosted on a mobile entity, wherein the system is operable to connect to a communication network.

The apparatus is adapted to negotiate, with a digital representative of a cooperating system hosted on a mobile entity, at least one of: provision of a resource to the system by the cooperating system, or provision of a resource to the cooperating system by the system.

According to examples of the present disclosure, the apparatus may be further adapted to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
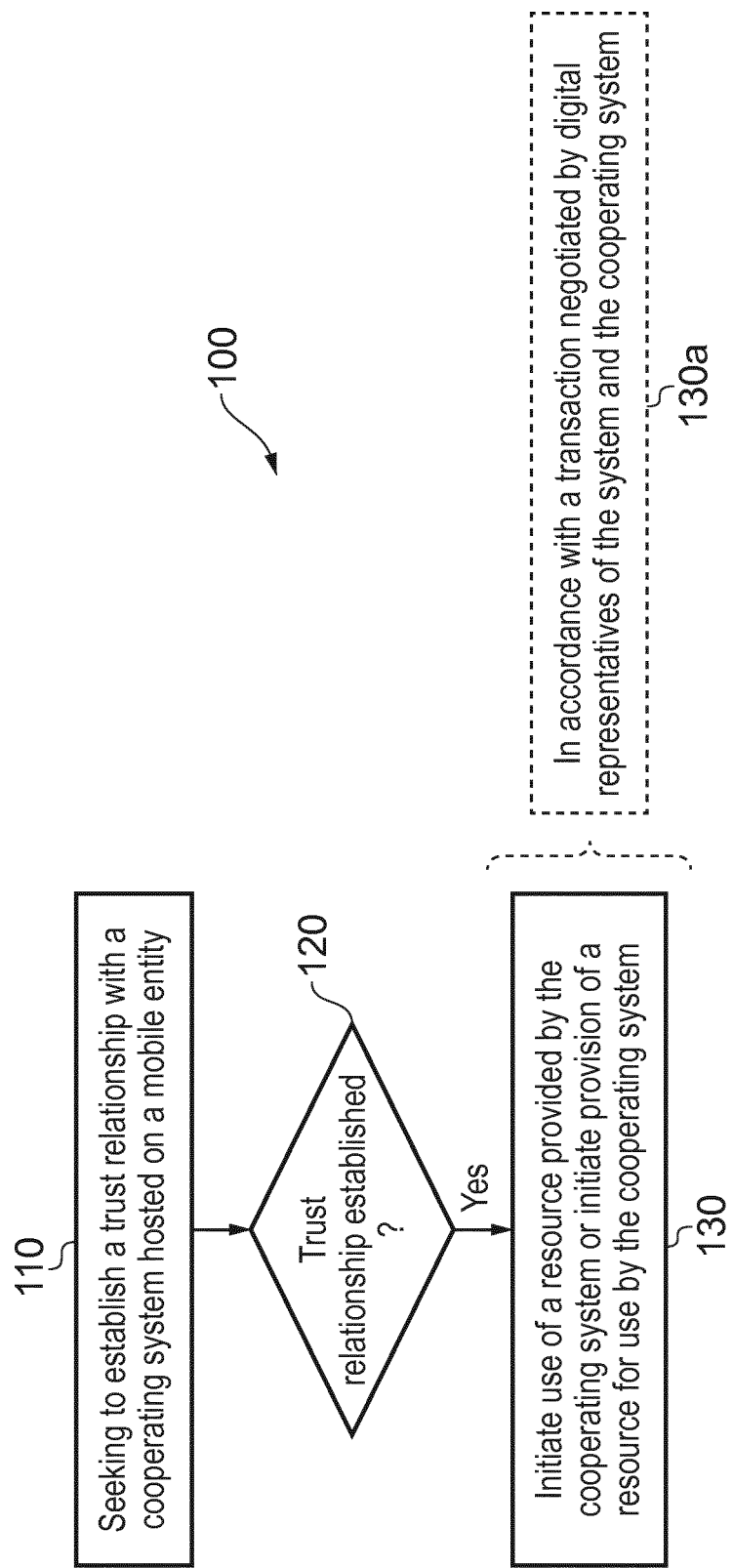
FIG. 1 is a flow chart illustrating process steps in a method for operating a system hosted on a mobile entity.

Aspects of the present disclosure provide methods for operation of a system and function that facilitate the sharing of resources between systems. Such resources may include data, storage or computation capacity, network connectivity and bandwidth or other resources available to the system providing resources for use.

Some examples of the methods disclosed may make use of a decentralised trust system such as a smart contract blockchain system for sharing digital data among constrained edge network entities comprising one or more systems. The entities may in some examples be transportation entities such as shipping vessels, HGVs etc. Discovery of cooperating systems for resource sharing and the sharing of resources may be achieved using a combination of smart contract technologies and wireless technologies between neighbouring edge systems. Such methods may provide an alternative means of communication via a network in situations in which a system has sporadic or no-connectivity. Smart contracts may aggregate different contractors, targeted edge systems, their policies on resource sharing, security tokens for resource sharing and data exchange and references to any available private system data. On the basis of established smart contracts, the resource sharing and data exchange can be organised and prepared amongst preferable and available edge systems. When transportation systems arrives within an agreed proximity, they can share agreed resources, including directly exchanging any negotiated data and sharing connectivity capabilities, as negotiated by their digital representatives.

The concept of a digital twin is a known solution to back up data or/and to run dedicated data processing in a remote or central cloud. Digital twin processes can be used for example to optimise data collection and dependent data analyses and so optimise corresponding system performance. In the context of the present disclosure, a digital representative comprises a function which is running in the digital domain, for example in the cloud, and is configured to act on behalf of the system it represents. The digital representative may be configured with information about the system, may be configured with one or more processes for monitoring the system, predicting system needs, analysing system performance etc. Systems may exchange and synchronise different types of data with their digital representatives in the central cloud. The digital representative may have different data processing capabilities enabling data flow and use of data across offered related services. An example of such processing capabilities is discovery of cooperating systems for resource sharing.

Resources shared according to examples of the present disclosure may vary according to the needs and capabilities of particular cooperating systems. One example of resources that may be shared is data. For example, a cooperating system may provide up to date weather models or maps to another system, or may provide any other kind of data that is authorised for sharing and can be of use to the other system. Another example resources that may be shared is data storage. Thus in the case of delay tolerant networking, if neither system has network connectivity but one system will obtain network connectivity before the other, that system may temporarily store data before forwarding it to the network on behalf of the other system. Network connectivity and bandwidth for message example is therefore another example of resource that may be shared. Computing or processing capacity is another example of resource that may be shared. In addition, it will be appreciated that systems may have access to other functionality that is present on the entity of which they are a part. For example in the case of a transportation entity in the form of a shipping vessel, a particular vessel may be configured with surface search or imaging radar which could be of use to other vessels that do not have this capability. Access to such functionality may be another example of resource that can be shared according to examples of the present disclosure.

FIG. 1 is a flow chart illustrating process steps in a method 100 for operating a system hosted on a mobile entity, wherein the system is operable to connect to a communication network. The mobile entity on which the system is hosted may be a physical entity that is subject to one or more constraints upon its resources. Such constraints may include limitations on connectivity with the communication network. The mobile entity may comprise an edge node of the communication network. Example mobile entities may comprise transportation entities such as ships, airplanes, trains, heavy goods vehicles, cars or other vehicles, autonomous vehicles, robots, laptop or tablet computers, mobile phones etc. The system may comprise any system or subsystem that is hosted on the mobile entity, such as a navigation system, weather monitoring system, engine monitoring system, inventory control system etc. The method is performed by a controller of the system and comprises, in a first step 110, seeking to establish a trust relationship with a cooperating system hosted on a mobile entity. The cooperating system comprises any other system with which the system can communicate. The cooperating system may be hosted on the same mobile entity as the system the controller of which is performing the method, or may be hosted on a different mobile entity. It will be appreciated that mobile entities such as transportation entities may frequently comprise multiple systems that are provided by different vendors, and so may not have means of cooperation other than according to examples of the present disclosure. The method 100 further comprises, if it is determined at step 120 that a trust relationship with the cooperating system is established, performing at least one of initiating use of a resource provided by the cooperating system or initiating provision of a resource for use by the cooperating system in step 130. It will be appreciated that the system the controller of which is performing the method may therefore be the system that is providing the resources for sharing (providing system) or may be the system that is using the shared resources (requesting system).

In some examples of the present disclosure, the system may have a digital representative running in the digital domain, and the step 130 of initiating use of a resource provided by the cooperating system or initiating provision of a resource for use by the cooperating system may comprise initiating use or provision of a resource in accordance with a transaction negotiated by digital representatives of the system and the cooperating system, as illustrated at step 130a. In other examples of the present disclosure, the system may perform purely opportunistic resource sharing, without prior negotiation of a specific sharing transaction by a digital representative. In such examples, a system may be configured with a sharing policy and may perform sharing of resources as required or initiated by another system in accordance with that policy. Examples of such policies may include sharing of certain specified resources between systems of the same vendor, or between systems of mobile entities belonging to the shame consortium or having an established business relationship. The step of seeking to establish a trust relationship may comprise verifying that a potential cooperating system owns a security credential such as a certificate from a trusted issuer in accordance with the policy. If ownership of a trusted certificate is confirmed, than the system may provide resources for the cooperating system, or use resources provided by the cooperating system, in accordance with any configuration details and/or limits set out in the stored policy.

Figure 2:
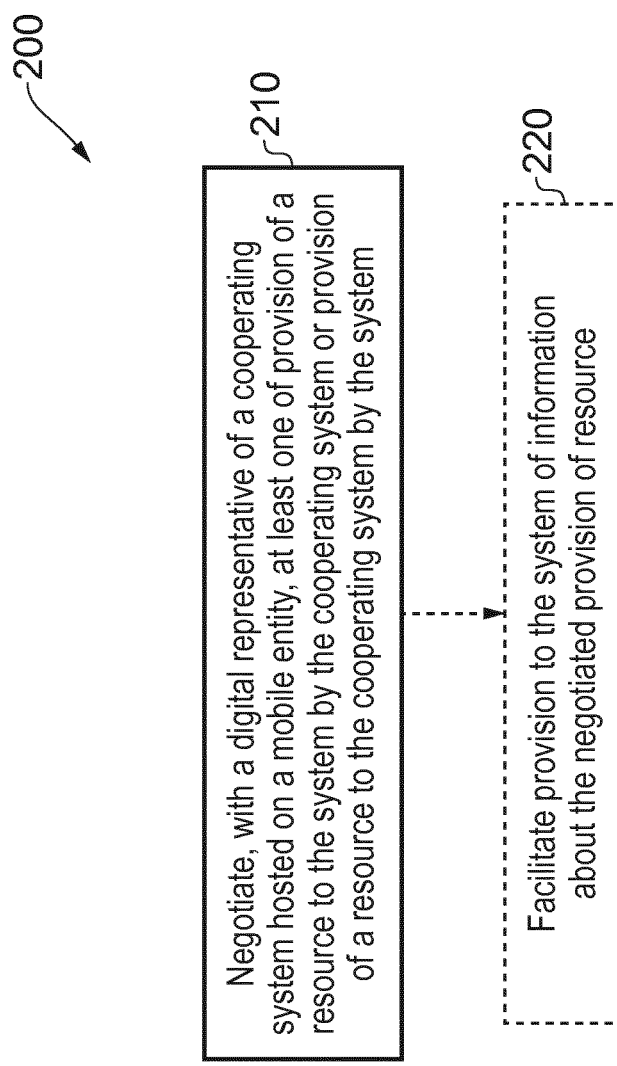
FIG. 2 is a flow chart illustrating process steps in a method for operating a function comprising a digital representative of a system hosted on a mobile entity.

FIG. 2 is a flow chart illustrating process steps in a method 200 for operating a function comprising a digital representative of a system hosted on a mobile entity, wherein the system is operable to connect to a communication network. As discussed above, the digital representative may comprise a function which is running in the digital domain, for example in the cloud, and is configured to act on behalf of the system it represents. The digital representative may be configured with information about the system, may be configured with one or more processes for monitoring the system, predicting system needs, analysing system performance etc. The method 200 is performed by the function and comprises, in a first step 210, negotiating, with a digital representative of a cooperating system hosted on a mobile entity, at least one of provision of a resource to the system by the cooperating system or provision of a resource to the cooperating system by the system. As illustrated at step 220, the method 200 may further comprise, in step 220, facilitating provision to the system of information about the negotiated provision of resource. The digital representative may provide such information directly to the system, or may provide such information for example to the digital representative of the cooperating system, for the information to be relayed via the cooperating system to the system. This may be appropriate in cases in which the system does not have network connectivity, and so cannot communicate directly with its digital representative. The digital representative may be configured with processes for monitoring operation of the system, for example on the basis of operational data for the system provided by the system controller. The digital representative may be further configured with predictive models for anticipating the operational requirements of the system.

Figure 3:
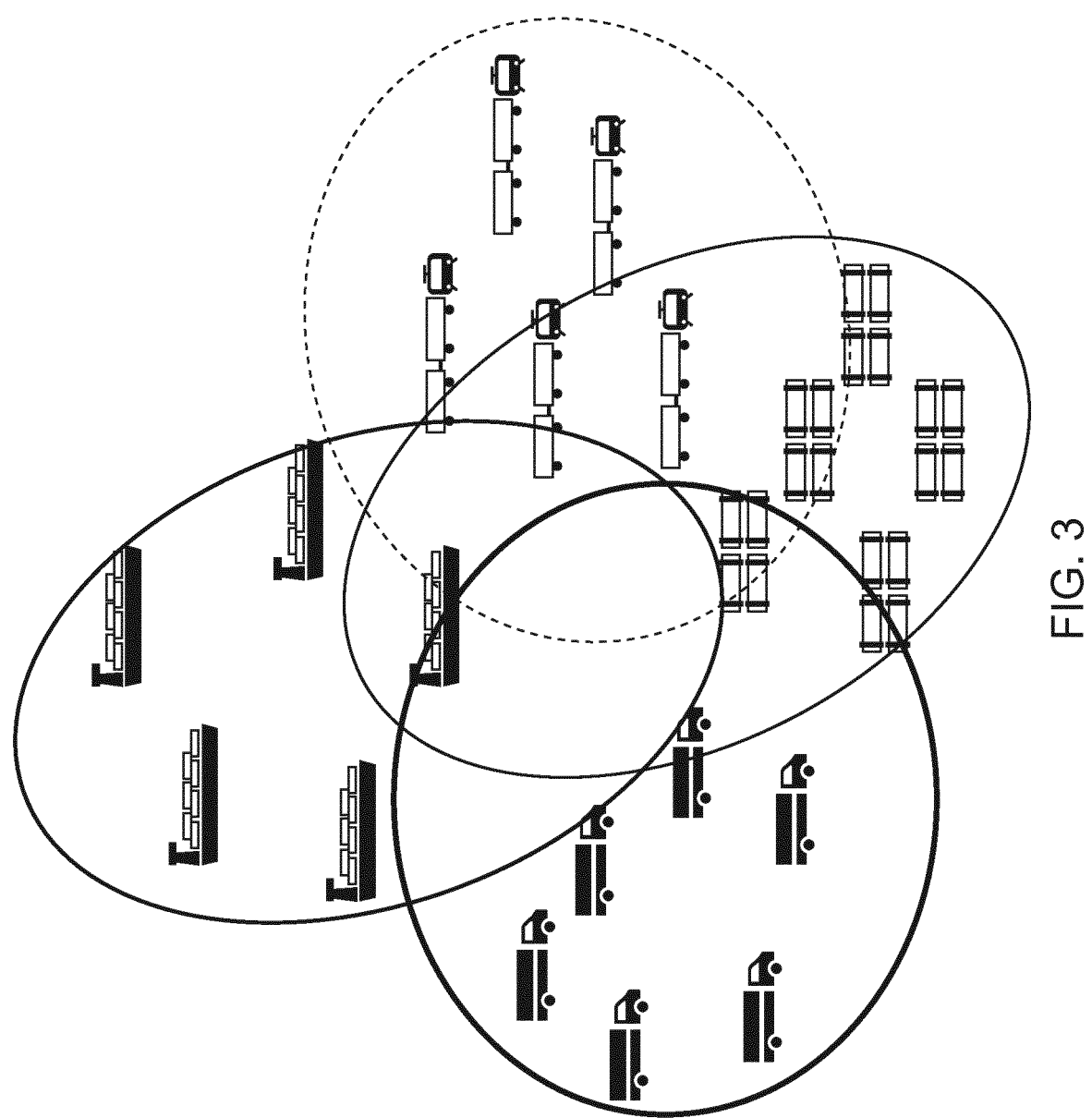
FIG. 3 is an illustration of resource sharing across vendors, industry sectors and industries.

FIG. 3 is an illustration of resource sharing across vendors, industry sectors and industries, as can be facilitated by examples of the present disclosure. Resource sharing across different vendors and sectors can be authorised according to established digital contracts and business agreements and policies. The sharing of data in particular in this manner can stimulate rich data analytics and machine learning loops, so enhancing performance and operational insight across multiple vendors and sectors.

Figure 4:
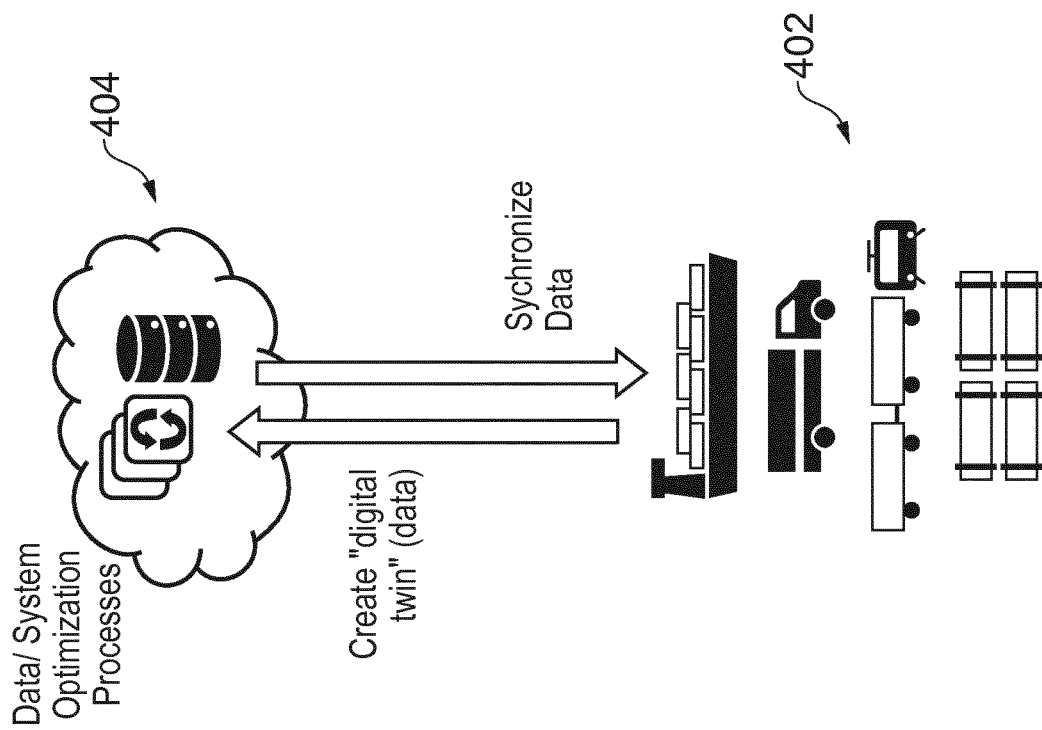
FIG. 4 is an illustration of data exchange and synchronisation between systems and their digital representations in the cloud.

FIG. 4 is an illustration of data exchange and synchronisation between systems and their digital representations in the cloud. As discussed above, systems on mobile entities 402 can provide data to their digital representatives, on the basis of which, monitoring, optimisation and resource prediction processes in the digital representative may be run. Data may be synchronised between the systems and their digital representatives, and, on the basis of data received from a system or prediction processes running within the digital representative, a digital representative may initiate discovery of cooperating systems for resource sharing, as discussed in further detail below with reference to FIGS. 7 to 9.

Figure 5:
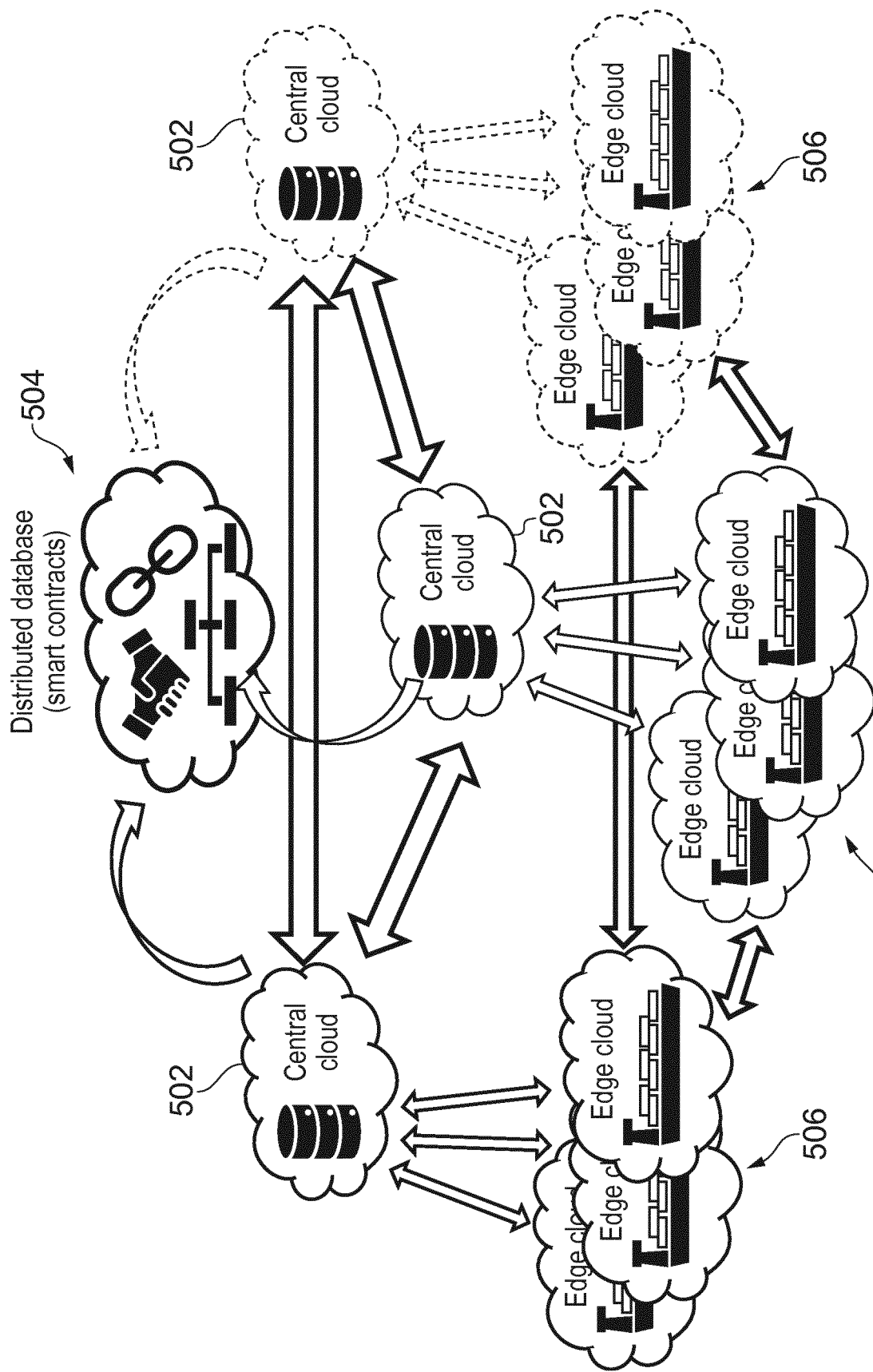
FIG. 5 is an illustration of distributed data and/or other resource sharing and related processes.

FIG. 5 is an illustration of distributed data and/or other resource sharing and related processes, across constrained transportation systems, as may be facilitates by methods according to the present disclosure. FIG. 5 also illustrates and offloading to the central cloud using a smart contract based decentralised trust system. As illustrated in FIG. 5, digital representatives 502 running it he cloud may cooperate to use a distributed trust system, as represented by a distributed database storing smart contracts, in order to establish resource sharing transactions which may be implemented by their corresponding systems. Information regarding these transactions is communicated to the systems hosted on mobile entities 506, allowing the systems to implement the resource sharing transactions when they are within range of the appropriate cooperating system.

Figure 6:
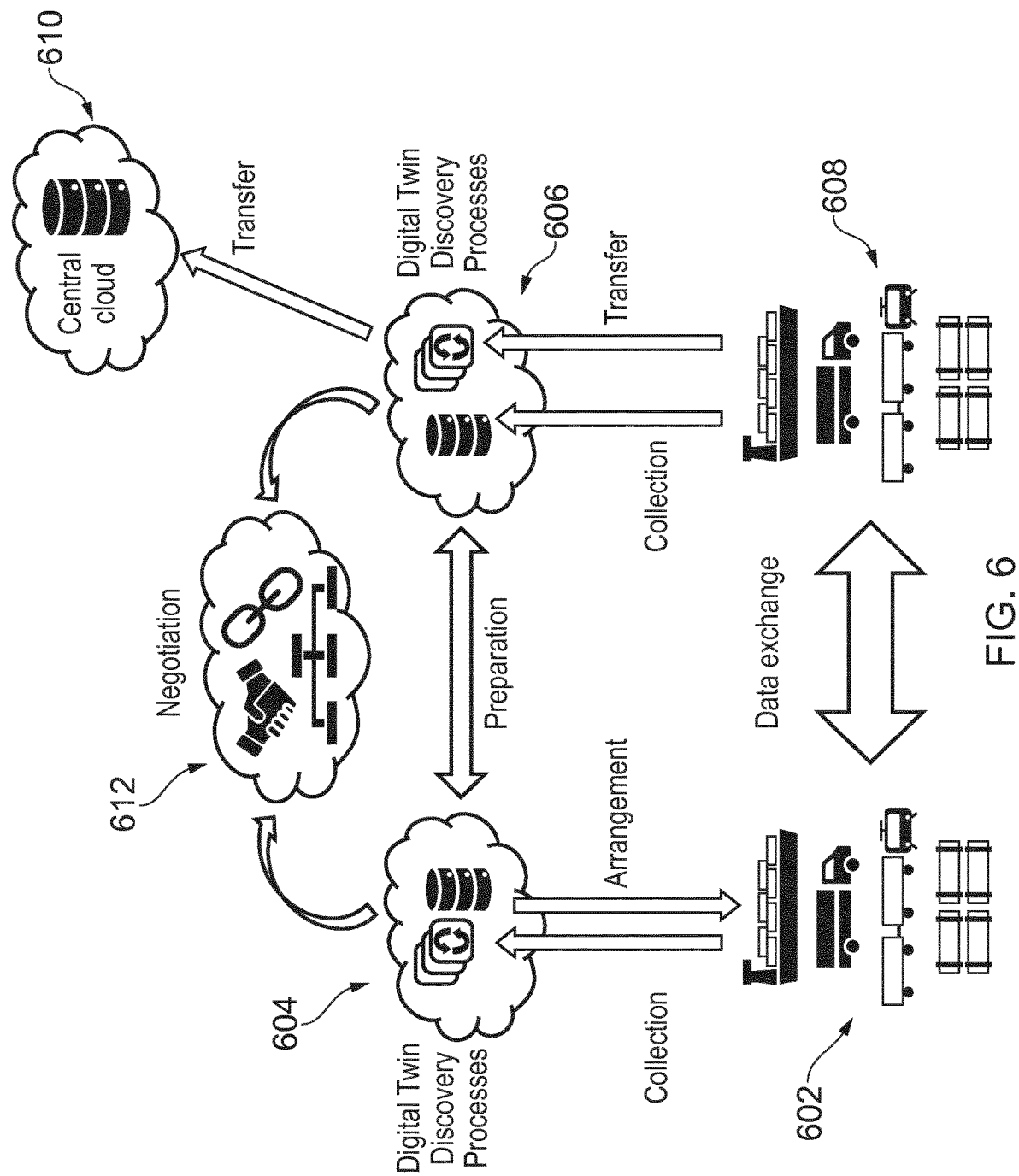
FIG. 6 illustrates negotiation and implementation of a resource sharing transaction.

FIG. 6 provides a more detailed illustration of negotiation and implementation of a resource sharing transaction. A system on a first mobile entity 602 sends data to its digital representative 604. On the basis of this data, the digital representative 604 determines that resource sharing will be required by its system, for example in the form of provision of network connectivity for data transfer during a period in which the system will not be able to access the network. The digital representative 604 therefore performs discovery of cooperating systems and negotiates a resource sharing transaction, for example within the context of an existing smart contract held in distributed storage. This negotiation between the digital representatives is illustrated at 612. The digital representative 604 prepares information concerning the negotiated transaction and the digital representative 606 of the cooperating system that will provide the resources. This information may be exchanged as part of the negotiation 612, or a separate segment of data exchange may be performed between the digital representatives 604, 606 over a secure channel negotiated during the transaction negotiation 612. Information about the negotiated transaction is returned by the digital representative 604 to its system. On encountering the cooperating system on mobile entity 608, the system on entity 602 provides information on the negotiated transaction, which information is verified by the cooperating system with its own digital representative 606. In another example, the cooperating system may verify the information locally, for example based on an authorisation of the information by its digital representative 606. The digital representative 606 may have authorised the information by signing the information with a credential. Once the transaction has been verified, resource sharing may take place, illustrated in FIG. 6 as data exchange. The cooperating system may then transfer the data it has received from the system on mobile entity 602 to its digital representative 606, which data may then be forwarded by the digital representative 606 to a central aggregation function 610, and/or to the digital representative of the system on mobile entity 602. In this manner, data from the system on mobile entity 602 may be provided to functions in the cloud even when the system itself has no network connectivity, owing to the sharing of resources available to a cooperating system.

Figure 7A:
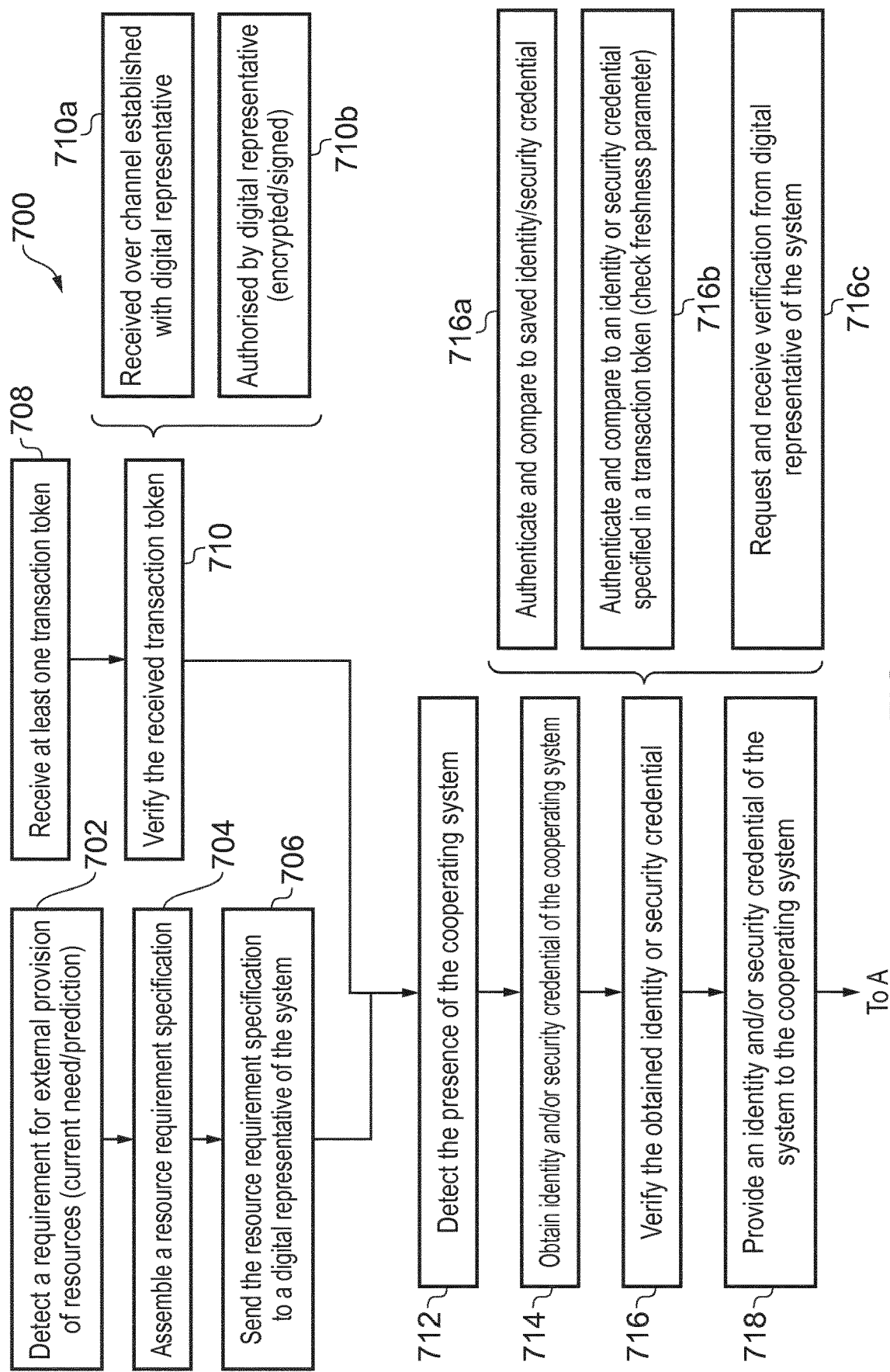
FIGS. 7a and 7b are flow charts illustrating process steps in another example of method for operating a system hosted on a mobile entity.
Figure 7B:
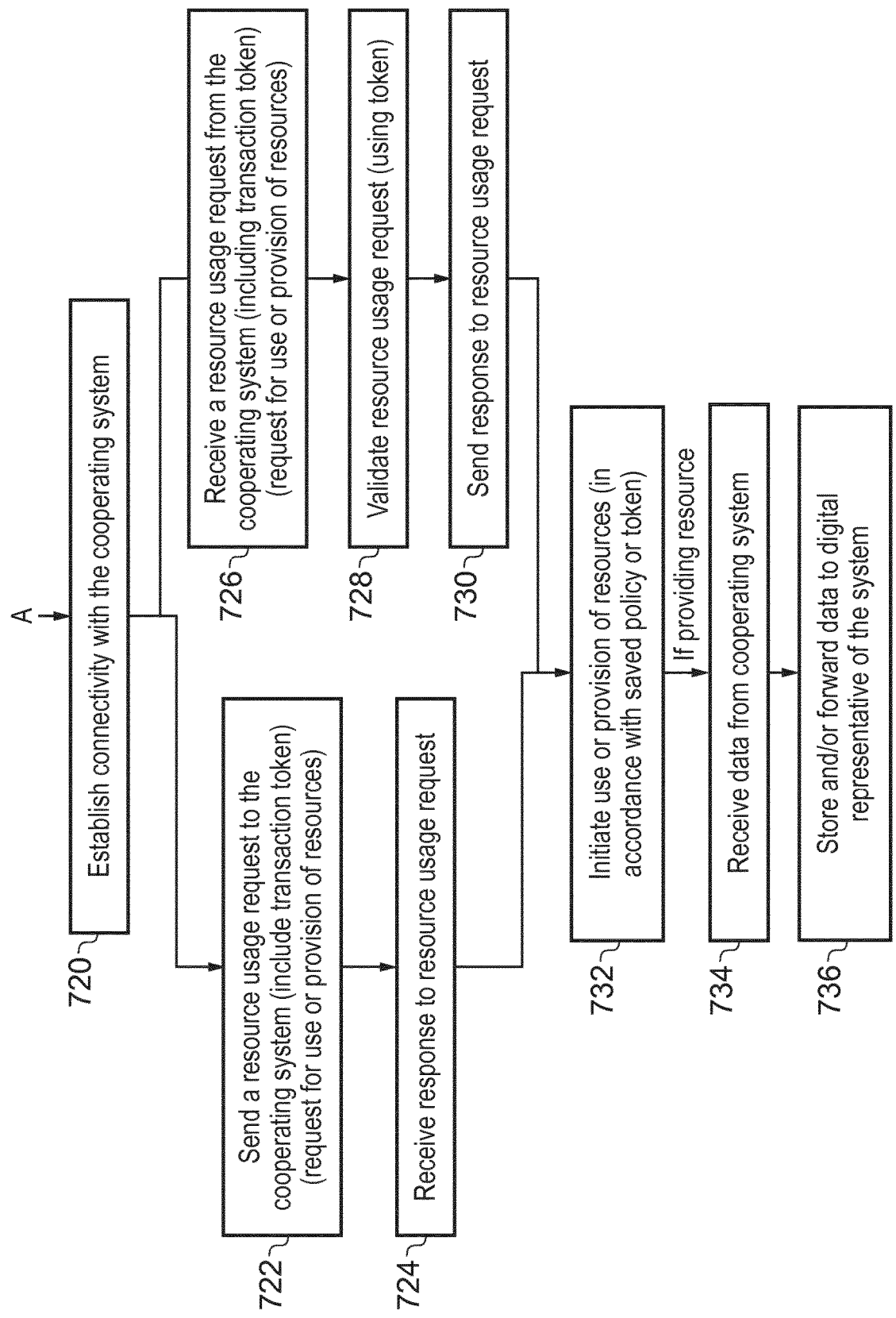

FIGS. 7a and 7b show a flow chart illustrating process steps in another example of a method 700 for operating a system hosted on a mobile entity, wherein the system is operable to connect to a communication network. The steps of the method 700 illustrate one way in which the steps of the method 100 may be implemented and supplemented in order to achieve the above discussed and additional functionality. As for the method 100 of FIG. 1, the mobile entity on which the system is hosted may be a physical entity that is subject to one or more constraints upon its resources. Such constraints may include limitations on connectivity with the communication network. The mobile entity may comprise an edge node of the communication network. Example mobile entities may comprise transportation entities such as ships, airplanes, trains, heavy goods vehicles, cars or other vehicles, autonomous vehicles, robots, laptop or tablet computers, mobile phones etc. The system may comprise any system or subsystem that is hosted on the mobile entity, such as a navigation system, weather monitoring system, engine monitoring system, inventory control system etc. The method is performed by a controller of the system. It will be appreciated that the system of FIG. 1 may be a system that is providing resources for sharing or that is using shared resources. Different example use cases for resource providing systems and resource using systems are illustrated and discussed below with reference to FIGS. 14 to 19.

In some examples of the present disclosure, the system may have a digital representative in the form of a virtualised function configured with information about the system. The digital representative may be configured with processes for monitoring operation of the system, for example on the basis of operational data for the system provided by the system controller. The digital representative may be further configured with predictive models for anticipating the operational requirements of the system. Such operational requirements may comprise data requirements, network connectivity requirements for the sending or receiving of data or control information, processing requirements such as computation, or any other examples of operational requirements. The system and digital representative may be mutually authenticated, for example using a shared secret or other security credentials In examples of the method 700 in which the system is a requesting system that seeks to use resources provided by a cooperating system, a need for resources may be detected by the system itself, so initiating a process of seeking a cooperating system to provide such resources. Alternatively, a future need for resources may be detected by the digital representative on the basis of predictive algorithms and monitoring. Both of these alternatives are illustrated in FIG. 7a.

Referring initially to FIG. 7a, in a first alternative, a system controller detects, in a first step 702, a requirement for external provision of resources. In the context of the present disclosure, "external" comprises external to those resources directly available to the system (such resources may be inherent to the system or hosted on the mobile entity and available to the system). Other resources hosted on the mobile entity may not be directly available to the system and so may be considered to be "external". The detected requirement for external resources may be a current requirement or may be a predicted future requirement for the provision of external resources. The prediction may be made on the basis of predictive algorithms using locally available data concerning mobility of the mobile entity, predicted path, predicted resource requirements etc. Thus for example, the system controller may determine that on the basis of the current predicted path of the mobile entity, network connectivity will not be available for a certain period, during which period, the system is configured to provide certain information to its digital representative. The system controller may therefore determine that external provision of network connectivity will be required. Alternatively, the system controller may determine that updated weather models will be required in a certain period of time, and that provision of such models by a suitable equipped cooperating system will be required. In another example, an unforeseen event may require surface scanning radar or other functionality not available to the system and which the system controller may seek to obtain via resource provision from a cooperating system. Other example current or predicted needs for resource sharing may be envisaged. In step 704, the system controller assembles a resource requirement specification setting out the required resources (data, connectivity, storage capacity, processing/computing capacity etc.), which specification is sent to the digital representative of the system in step 706.

In step 708, the system controller receives at least one transaction token and in step 710, the system controller verifies the received transaction token. Steps 708 and 710 may be performed by the controller after steps 702, 704 and 706, in examples in which the digital representative has negotiated a resource sharing transaction on the basis of the resource requirement specification sent by the system controller in step 706. In other examples of the method 700, for example in which a need for resources is predicted by the digital representative rather than the system controller, the system controller may not perform steps 702 to 706, meaning that the receipt and verification of the transaction token in steps 708 and 710 may be the first steps of the method 700 performed by the system controller. Reception of a transaction token may also be the first step in the method 700 in examples in which the system is to be providing resources for use by a cooperating system, rather than using such resources. In still further examples, in which there is no transaction negotiated by a digital representative, the first step of the method 700 may be the detection of the presence of a cooperating system in step 712, as discussed in further detail below.

Returning to steps 708 and 710, the transaction token may be received from a digital representative of the system or from the cooperating system, for example in a resource usage request. The transaction token may comprise a specification of resource usage identifying at least the system, a cooperating system, and resources provided by the cooperating system that may be used by the system or resources available to the system that may be provided to a cooperating system. The transaction token may comprise or be accompanied by additional information facilitating the use of resources specified in the transaction token, including for example anchoring points for connectivity etc.

The step 710 of verifying the received transaction token may be implemented in different ways, depending upon the nature of the transaction token and the entity from which it was received. In one example, verifying the received transaction token comprises confirming that the received transaction token has been received over a communication channel established between the system and its inherently trusted digital representative, in step 710*a*. In another example, such as when the transaction token has been received from the cooperating system, verifying the received transaction token comprises verifying that the received transaction token has been authorised by the digital representative of the system, for example through digital signature of the token or particular parts of the token using a security credential associated with the digital representative of the system. Authorisation may also or alternatively be established by decrypting the received transaction token using a security credential associated with the digital representative of the system. A transaction token and/or the transaction it specifies may also or alternatively be verified against local policy in the system.

It will be appreciated that both the system and the cooperating system should be able to inspect the content of the transaction token, and if it has been encrypted by a digital representative, typically only the system whose digital representative has encrypted the token will be able to decrypt it. However, that system may then share the decrypted transaction token with the cooperating system. In such cases it may be beneficial to have the unencrypted token be accompanied by a corresponding digital signature of the digital representative of the cooperating system.

In step 712, the system controller detects the presence of the cooperating system, which may be achieved by any appropriate means (broadcast over short range/long range radio etc.). The system controller then seeks to establish a trust relationship with a cooperating system hosted on a mobile entity. This is achieved through a combination of steps which may comprise one or more of steps 714 to 718 as discussed below.

In step 714, the system controller obtains at least one of an identity of the cooperating system or a security credential of the cooperating system, and in step 716, the system controller verifies the obtained identity or security credential. In some examples, security credential verification may be performed using asymmetric cryptography: verifying that the cooperating system owns the certificate/public key by having the cooperating system use the corresponding private key. In some examples, the issuer of the certificate can also be verified to be a trusted party. In such examples the trust is twofold; the ownership of the certificate is established (for example using a private key), and the issuer of the certificate is mapped to a trusted entity (for example a shipping company). In such examples, verification of a security credential may ensure compliance with a trust policy that specifies trust of any system having a certificate from particular certificate issuer, provided the system can establish that they own the certificate (for example using the corresponding private key).

Verifying the obtained identity or security credential may thus comprise authenticating the obtained identity or security credential and comparing the obtained identity or security credential to a saved identity or security credential in step 716*a* or to an identity or security credential specified in a transaction token at step 716*b*, which token may have been received at step 708. The transaction token may comprise a freshness parameter, which may be verified to ensure that the token remains valid. Some transaction tokens may for example be single use, or a group of tokens may be issued for resource sharing with multiple cooperating systems, with only one token from among the group to be used. In still further examples, a token may be limited by time or geographical region, and the freshness parameter may be used to confirm that such limitations are complied with.

In still further examples, verifying the obtained identity or security credential may comprise requesting verification of the obtained identity or security credential from a digital representative of the system and receiving a verification response from the digital representative in step 716*c*. This may be particularly appropriate in the case of a system that is to provide resources, and so may have network connectivity allowing for communication with its digital representative. The verification response may be accompanied by a specification of resources provided by the cooperating system that the system is authorised to use or a specification of resources that the system is authorised to provide to the cooperating system.

In step 718, the system controller provides an identity of the system or a security credential of the system to the cooperating system, allowing for mutual verification by the system and cooperating system. Once such mutual verification is established, it may be considered that a trust relationship has been established between the system and the cooperation system. Referring now to FIG. 7*b*, in step 720, the system controller establishes connectivity with the cooperating system in the form of a communication channel for the sharing of resources. This may be performed by any appropriate means (broadcast over short range/long range radio etc.). Connectivity may be established using information provided in the transaction token (including anchoring points etc.). It will be appreciated that some connectivity between the system and cooperating system is required for mutual authentication. However, as a part of mutual authentication, a secure communication channel may be established between the systems, including for example Transport Layer security (TLS), for securing future communication for the sharing of resources. This secure communication channel may comprise one part of the trust relationship and is related to the connectivity with the peer.

The system controller may then perform either steps 722 and 724, if the system is initiating sharing, or steps 726 to 730, if the cooperating system is initiating sharing.

If the system is initiating sharing, the system controller sends, in step 722, a resource usage request to the cooperating system. Included with the resource usage request may be the transaction token in which the cooperating system is identified and which was received in step 708. The resource usage request may further comprise additional information including configuration information for the use of resources, metadata etc. The request may indicate that the system is seeking to initiate use of resources provided by the cooperating system, or that the system is seeking to initiate provision of resources to the cooperating system (for example if a transaction has been negotiated by digital representatives on the basis of prediction of need by the digital representative of the cooperating system and hence without the knowledge of the cooperating system). In step 724, the system controller receives a response to the resource usage request, which may confirm or reject the request.

If the system is not initiating sharing, then at step 726, the system controller may receive a resource usage request from the cooperating system. As discussed above, this request may include a transaction token and may further comprise additional information including configuration information for the use of resources, metadata etc. The request may indicate that the cooperating system is seeking to initiate use of resources provided by the system, or that the cooperating system is seeking to initiate provision of resources to the system. In step 728, the system validates the resource usage request to conform that the request has been authorised by its digital representative. This may validation may be performed for example using a credential included with the transaction token, and/or on the basis of information in the token that specifies what resources can be used and may specify one or more ways in which the resources may be used. This information may be checked against local policy in the system. In step 730, the system controller sends a response either accepting or rejecting the resource usage request.

In step 732, and if the resource usage request has been accepted, the system initiates use or provision of one or more resources in accordance with a saved policy or with the details included in the transaction token. Subsequent steps may depend upon whether the system is using or providing resources, and upon the nature of the resources being shared. In some examples, if the system is providing resources, the system controller may receive data from the cooperating system in step 734 and store and/or forward that data to its digital representative in step 736. In other examples, the providing system may transmit data to the coopering system, or may provide access to other functionality available to the system. In still further examples, the providing system may receive and performing a task, such as a computing or processing task, for example on the basis of data received from the cooperating system, displaying information etc. The providing system may additionally provide a result of the performed task to at least one of the cooperating system or the digital representative of the providing system, for example for forwarding to the digital representative of the cooperating system or to a central repository or function.

Some or all of the steps of the method 700 may be repeated multiple times and in different combinations depending upon the particular circumstances of a system at any given time. For example, a system may both use and provide resources in a single transaction, or may use resources in one transaction and provide resources in another transaction at a different time. It will be appreciated that multiple different combinations of the method steps discussed above may be envisaged, depending upon the circumstances and implementation choices applicable to a particular system at different times during its operational life.

Figure 8A:
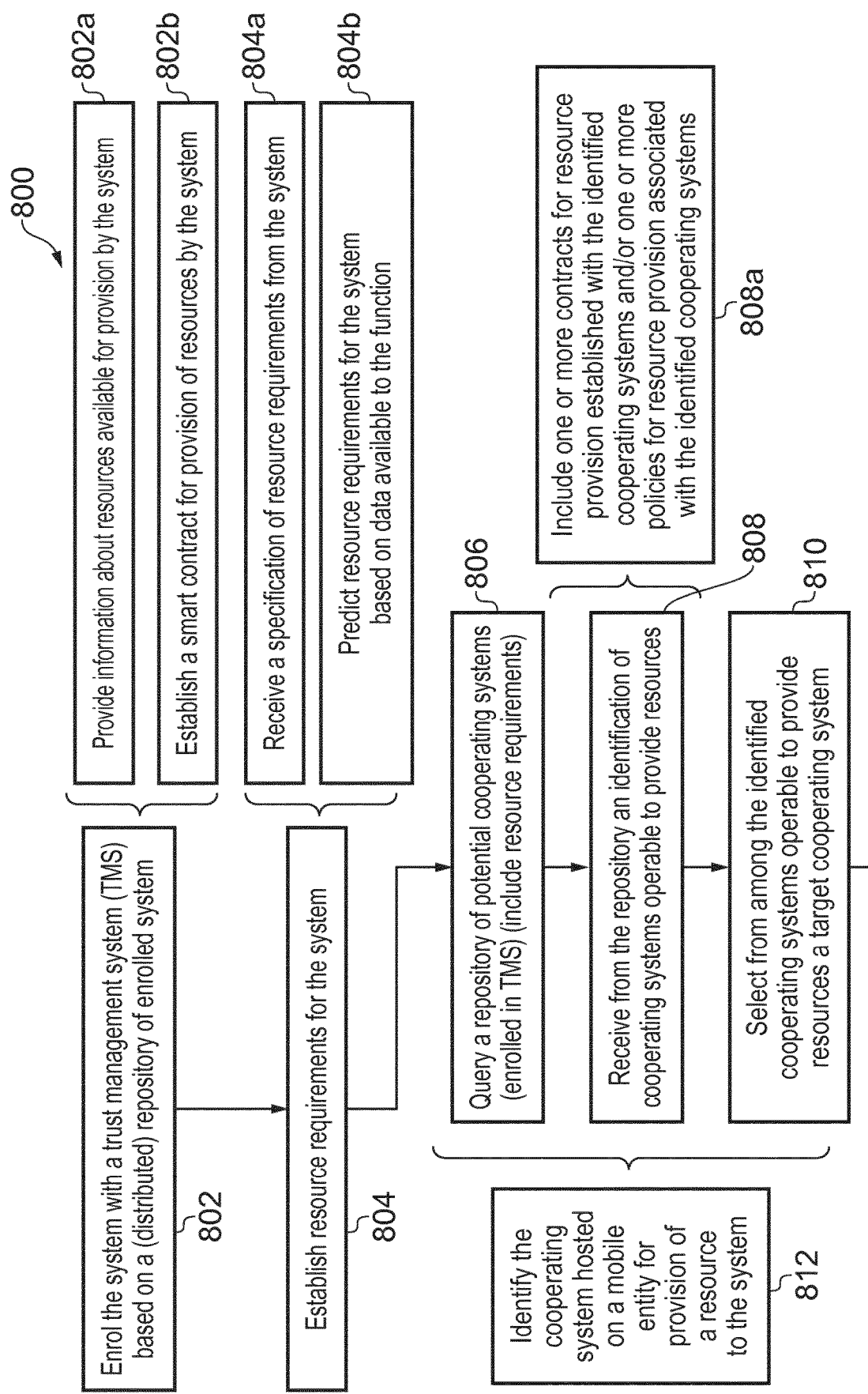
FIGS. 8a and 8b are flow charts illustrating process steps in another example of method for operating a function comprising a digital representative of a system hosted on a mobile entity.
Figure 8B:
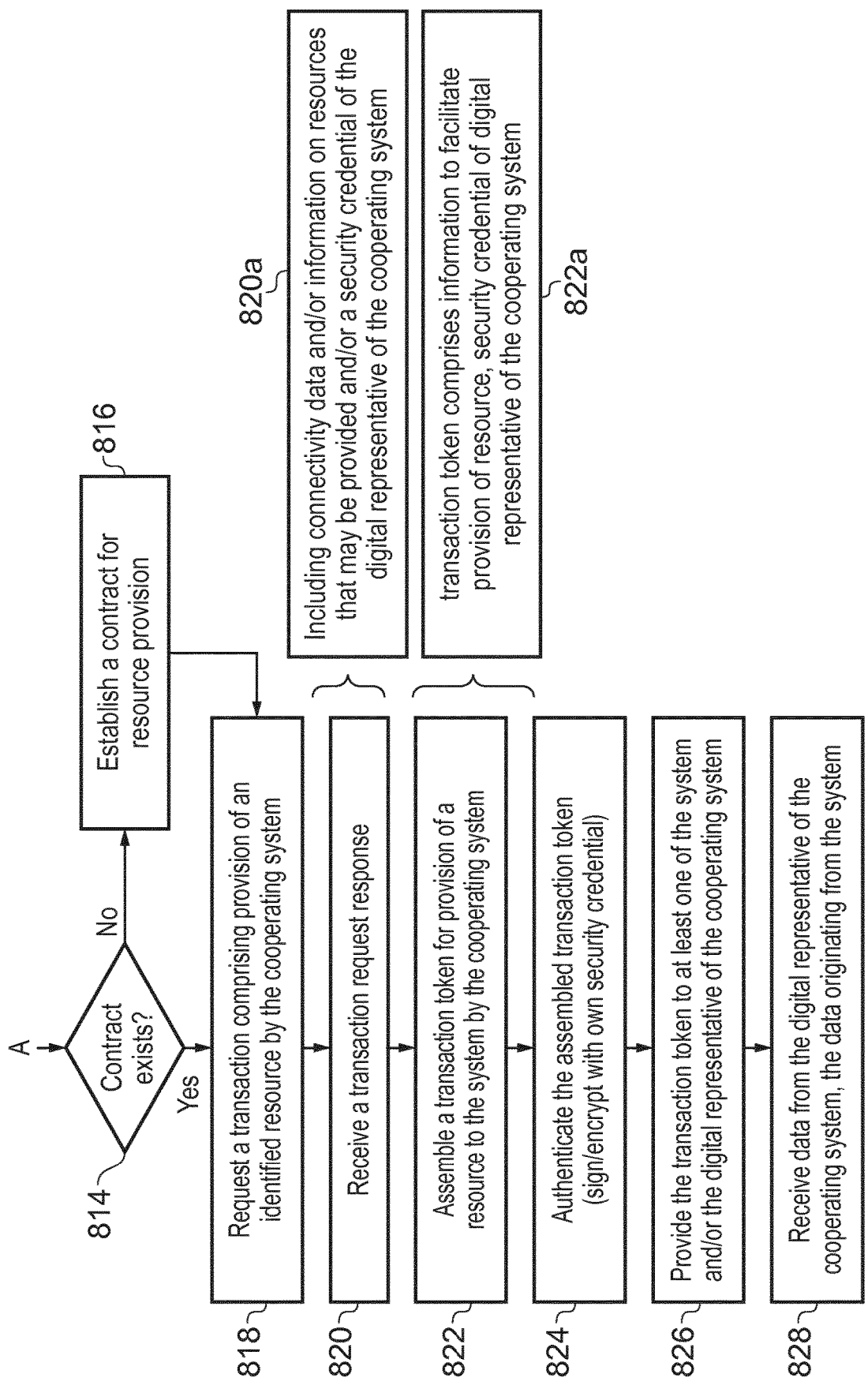
Figure 9A:
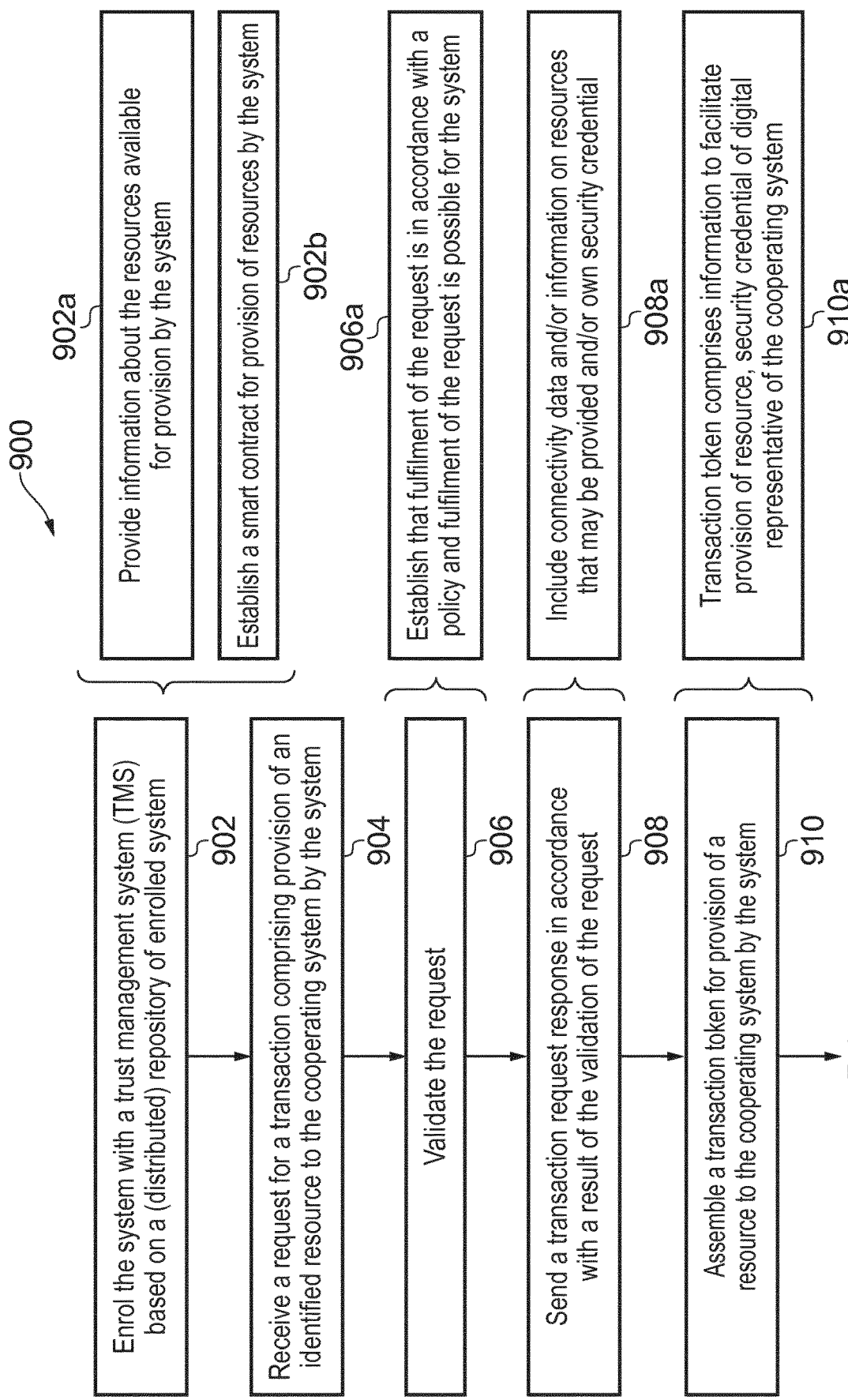
FIGS. 9a and 9b are flow charts illustrating process steps in another example of method for operating a function comprising a digital representative of a system hosted on a mobile entity
Figure 9B:
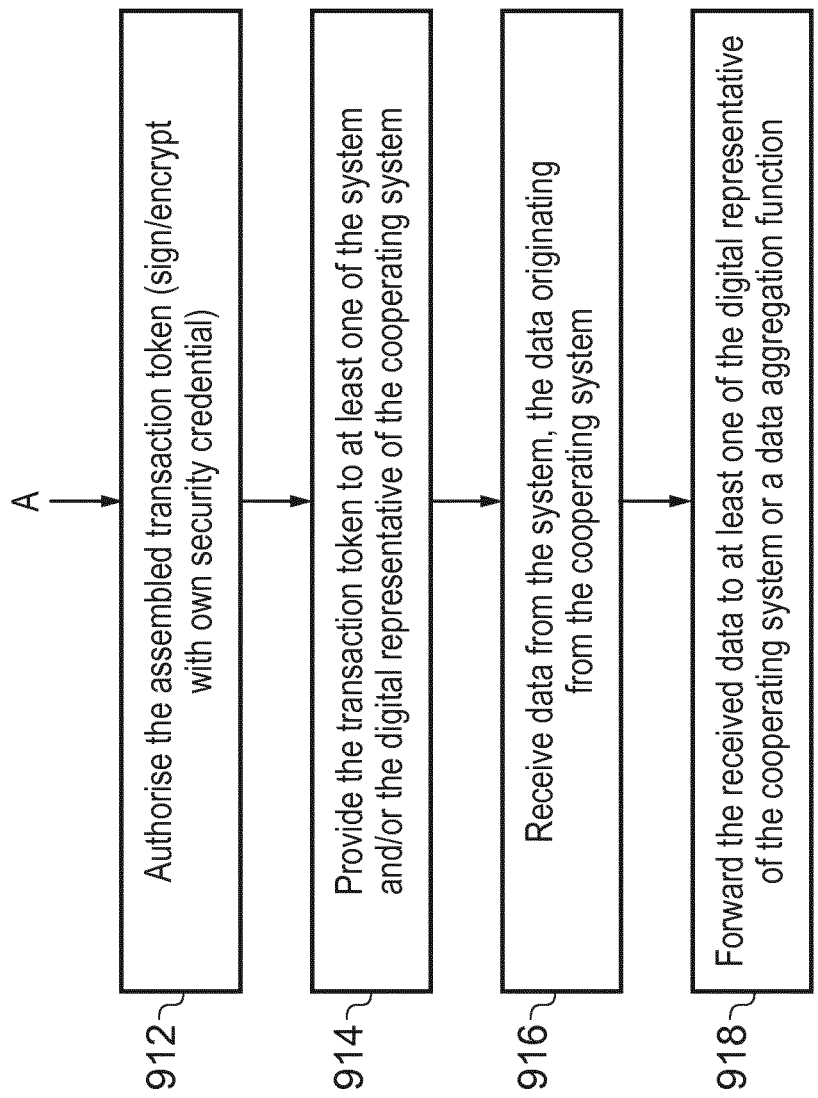

FIGS. 8a and 8b illustrate a method performed by a digital representative of a system that is seeking to use resources provided by a cooperating system. FIGS. 9a and 9b illustrate a method performed by a digital representative of a system that is seeking to provide resources to a cooperating system. In each case, resource sharing may be initiated either by the system or the digital representative of either the resource using or the resource providing system. This is discussed in the following description of FIGS. 8a, 8b, 9a and 9b and illustrated via the use cases illustrated in FIGS. 14 to 19.

FIGS. 8a and 8b show a flow chart illustrating process steps in another example of a method 800 for operating a function comprising a digital representative of a system hosted on a mobile entity, wherein the system is operable to connect to a communication network. The steps of the method 800 illustrate one way in which the steps of the method 200 may be implemented and supplemented in order to achieve the above discussed and additional functionality. As discussed above with reference to FIG. 2, the digital representative may comprise a function which is running in the digital domain, for example in the cloud, and is configured to act on behalf of the system it represents. The digital representative may be configured with information about the system, may be configured with one or more processes for monitoring operation of the first system, for example on the basis of operational data for the system provided by the system controller. The digital representative may be further configured with predictive models for anticipating the operational requirements of the system.

Referring initially to FIG. 8a, in a first step 802, the digital representative enrols the system with a trust management system (TMS) based on a repository of enrolled systems. The repository of enrolled systems may be a distributed repository such as a distributed ledger. The TMS may in some examples be implemented in a blockchain system. The repository may alternatively comprise a centralised repository such as a database. As illustrated in step 802a, enrolling the system in the TMS may comprise providing information about the resources available for provision by the system and may also or alternatively comprise, in step 802b, establishing a smart contract for provision of resources by the system, which contract may be established within the framework of the TMS. A smart contract may be considered as a business framework within which individual transactions may be established over a blockchain related trusted channel at any point of time after smart contract is established.

In step 804, the digital representative establishes resource requirements for the system. This may comprise receiving a specification of resource requirements from the system in step 804a or predicting resource requirements for the system based on data available to the function in step 804b.

The digital representative then identifies a cooperating system hosted on a mobile entity for provision of a resource to the system in step 812. As illustrated in FIG. 8a, this comprises, at step 806, querying a repository of potential cooperating systems, which repository may contain systems enrolled in the TMS. As discussed above, the repository of potential cooperating systems may be centralised or distributed, for example based on a distributed ledger etc. The established resource requirements for the system may be included with the query. The query may additionally specify a geographical location within which the required resources should be provided and/or a time period within which the required resources should be provided.

In step 808, the digital representative receives from the repository an identification of cooperating systems operable to provide resources. The resources may be exactly those specified in the query or may vary slightly, according to the availability of systems for providing exactly the specified resources in accordance with any additional geographical or time limitations. Included with the identification of cooperating systems may be one or more contracts for resource provision established with the identified cooperating systems and/or one or more policies for resource provision associated with the identified cooperating systems, as illustrated at step 808a.

In step 810, the digital representative selects from among the identified cooperating systems operable to provide resources a target cooperating system, so completing the step 812 of identifying a cooperating system hosted on a mobile entity for provision of a resource to the system. The target cooperating system may be selected on the basis of a best match between resources that the cooperating systems may provide and the resource requirements of the system. Selection may take into account already existing contracts, so preferring amongst cooperating systems with a similar match between resources offered and resource requirements, a cooperating system for which a contract already exists.

Referring now to FIG. 8b, if a contract does not already exist for provision of resources to the system by the target cooperating system, the digital representative may establish a contract for resource provision in step 816, for example via negotiation with the digital representative of the target cooperating system.

In step 818, the digital representative requests a transaction comprising provision of an identified resource by the cooperating system. The transaction request may be addressed to the repository of potential cooperating systems or alternatively may be addressed directly to the digital representative of the target cooperating system.

Included in the transaction request may be resource usage details such as data for transfer or other resource to be provided, time window for resource provision, mobile entity route, policy details, connectivity parameters etc. The transaction may be requested within the context of the established smart contract for the provision of resources by the cooperating system.

In step 820, the digital representative receives a transaction request response, either from the repository of potential cooperating systems or directly from the digital representative of the cooperating system.

As indicated in step 820a, the transaction request response may comprise at least one of connectivity data for establishing connectivity with the cooperating system (which may include an identity or credential of the cooperating system), information on resources of the cooperating system that may be provided by the cooperating system to the system and/or a security credential of a digital representative of the cooperating system. In order to assist with verifying a digital signature, the security credential (such as a certificate) may be sent together with the digital signature, providing the information about which certificate/public key to use. In some examples, in order to optimise data transfer, the certificate may be omitted as there may only be one possible entity (the digital representative) that can sign transaction tokens for the system. However, the digital representative of the cooperating system should (unless the token is provided to the cooperating system by its digital representative) sign relevant parts of the information contained in the transaction request. These relevant parts should include at least the resources to share with the system, system identity and/or credential, so that the cooperating system can verify that it is allowed to execute the token content with the system, and the identity of the cooperating system, so that the cooperating system can confirm that the token is addressed to it as cooperating system, as opposed to some other cooperating system. The transaction response can include any relevant information on resources/services that can be shared by the cooperating system with the system. Owing to cost/connectivity constraints, only a digested set of this information exchanged between digital representatives may be transferred to the system or the cooperating system.

In step 822, the digital representative assembles a transaction token for provision of a resource to the system by the cooperating system. As illustrated at 822a, the transaction token comprises information to facilitate provision of a resource to the system by the cooperating system. Examples of such information may comprise: a specification of resources to be provided by the cooperating system and used by the system, identification of the cooperating system, a security credential or identity of the cooperating system, a freshness parameter such as a time stamp or sequence number, connectivity data such as a credential and/or identity of the system, cooperating system digital representative signature of relevant information etc. The transaction token may additionally comprise a digital signature and in some examples security credential of the digital representative of the cooperating system, so allowing for the cooperating system to verify that the transaction of the transaction token has been authorised by its digital representative, in case the token is not provided to the cooperating system by its digital representative but via the system. In such cases, the digital signature of the cooperating system digital representative is required to enable the cooperating system to verify that is it authorised to carry out the transaction.

It will be appreciated form the above discussion that both the system and the cooperating system should be able to verify that their digital representative has authorised the provision or use of resources, by providing an identity and/or credential of the systems, resource to share, and how to share the resources. This verification can be performed either by the system and/or cooperating system receiving a transaction token from their respective digital representative, or by having their respective digital representative sign the relevant data (an identity and/or credential of the systems, resource to share, and how to share the resources). A transaction token may in some examples have both signatures and be received from own twin. In this case, one system has two modes of verification, and the second signature is transferred to the other system.

Referring again to FIG. 8b, in step 824, the digital representative authorises the assembled transaction token, for example by signing the token with a security credential of the function or by encrypting the token. In step 826, the digital representative then provides the transaction token to at least one of the system and/or the digital representative of the cooperating system. The transaction token facilitates the establishing of a trust relationship between the system and cooperating system and subsequent resource sharing between the system and cooperating system. Subsequent method steps may depend upon the nature of the resources provided by the cooperating system and used by the system, but may include, at step 828, receiving data from the digital representative of the cooperating system, the data originating from the system.

As discussed above, FIGS. 9a and 9b show a flow chart illustrating process steps in another example of a method 900 for operating a system hosted on a mobile entity, wherein the system is operable to connect to a communication network. The steps of the method 900 illustrate another way in which the steps of the method 200 may be implemented and supplemented in order to achieve the above discussed and additional functionality. As discussed above with reference to FIG. 2, the digital representative may comprise a function which is running in the digital domain, for example in the cloud, and is configured to act on behalf of the system it represents. The digital representative may be configured with information about the system, may be configured with one or more processes for monitoring operation of the first system, for example on the basis of operational data for the system provided by the system controller. The digital representative may be further configured with predictive models for anticipating the operational requirements of the system. The method 900 illustrates steps that may be performed by a digital representative of a system that will provide resources for use by a cooperating system.

Referring initially to FIG. 9a, in a first step 902, the digital representative enrols the system with a trust management system (TMS) based on a repository of enrolled systems. As discussed above with reference to FIG. 8a, the repository of enrolled systems may be a distributed repository such as a distributed ledger. The TMS may in some examples be implemented in a blockchain system. The repository may alternatively comprise a centralised repository such as a database. As illustrated in step 902a, enrolling the system in the TMS may comprise providing information about the resources available for provision by the system and may also or alternatively comprise, in step 902b, establishing a smart contract for provision of resources by the system, which contract may be established within the framework of the TMS. A smart contract may be considered as a business framework within which individual transactions may be established over a blockchain related trusted channel at any point of time after smart contract is established.

In step 904, the digital representative receives a request for a transaction comprising provision of an identified resource to a cooperating system by the system. The request may be received from the repository of potential cooperating systems or directly from the digital representative of the cooperating system. In step 906, the digital representative validates the request, which may comprise, at step 906a, establishing that fulfilment of the request is in accordance with a policy and that fulfilment of the request is possible for the system in light of the systems own resource requirements, mobile entity location and predicted path etc. In step 908, the digital representative sends a transaction request response in accordance with a result of the validation of the request. This may be sent to the repository or to the digital representative of the cooperating system. If validation of the transaction request is successful, the transaction request response may comprises, as illustrated at 908a, at least one of connectivity data for establishing connectivity with the system, information on resources of the system that may be provided to the cooperating system by the system and/or a security credential of the digital representative (so allowing its system to confirm that the transaction has been authorised, if a transaction token is not provided directly to the system by the digital representative).

In step 910, the digital representative assembles a transaction token for provision of a resource to the cooperating system by the system. As illustrated at 910a, the transaction token comprises information to facilitate provision of a resource to the cooperating system by the system. Examples of such information may comprise: a specification of resources to be provided by the system and used by the cooperating system, identification of the cooperating system, a security credential or identity of the cooperating system, a freshness parameter such as a time stamp or sequence number, connectivity data such as a credential and/or identity of the system, cooperating system digital representative signature of relevant information etc. The transaction token may additionally comprise a digital signature and in some examples security credential of the digital representative of the cooperating system, so allowing for the cooperating system to verify that the transaction of the transaction token has been authorised by its digital representative, in case the token is not provided to the cooperating system by its digital representative but via the system. In such cases, the digital signature of the cooperating system digital representative is required to enable the cooperating system to verify that is it authorised to carry out the transaction.

As discussed above with reference to step 822 of FIG. 8b, both the system and the cooperating system should be able to verify that their digital representative has authorised the provision or use of resources, by providing an identity and/or credential of the systems, resource to share, and how to share the resources. This verification can be performed either by the system and/or cooperating system receiving a transaction token from their respective digital representative, or by having their respective digital representative sign the relevant data.

Referring now to FIG. 9b, in step 912, the digital representative authorises the assembled transaction token, for example by signing the token with a security credential of the function or by encrypting the token. In step 914, the digital representative then provides the transaction token to at least one of the system and/or the digital representative of the cooperating system. It will be appreciated that in different examples of the proposed methods, either or both of the digital representatives involved in the transaction may assemble a transaction token for the transaction. If only one transaction token is assembled, that token may be provided by the digital representative that assembled it to the other digital representative and to both systems, either directly via the systems' own digital representatives or via the other digital representative and cooperating system, if connectivity with the digital representative's own system is not currently available. The transaction token facilitates the establishing of a trust relationship between the system and cooperating system and subsequent resource sharing between the system and cooperating system. Subsequent method steps may depend upon the nature of the resources provided by the system and used by the cooperating system. Such steps may include, at step 916, receiving data from the system, the data originating from the cooperating system, and, at step 918, forwarding the received data to at least one of the digital representative of the cooperating system or a data aggregation function. The data aggregation function may be centralised or distributed, and may be hosted in the cloud.

It will be appreciated that a single digital representative may perform steps of the method 800 and/or 900 at different times, depending upon the needs and capabilities of its system. As discussed above, a single system may both provide and use resources to/from different cooperating systems, and a digital representative may thus facilitate the provision and or use of resources by its system.

As discussed above, the methods 100 and 700 are performed by a system controller and the methods 200, 800 and 900 are performed by a function comprising a digital representative of a system. The present disclosure provides a controller and a function which are adapted to perform any or all of the steps of the above discussed methods.

Figure 10:
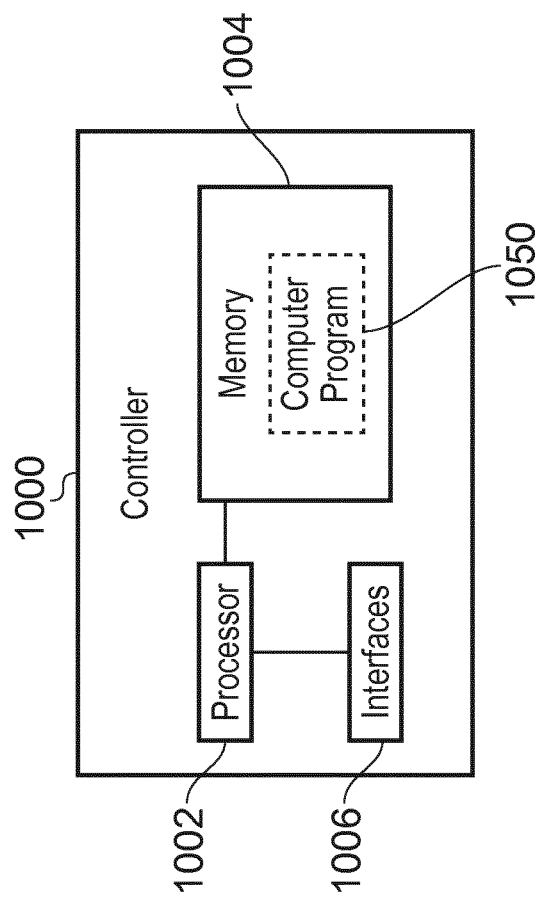
FIG. 10 is a block diagram illustrating functional modules in a controller.

FIG. 10 is a block diagram illustrating an example controller 1000 which may implement the method 100 and/or 700 according to examples of the present disclosure, for example on receipt of suitable instructions from a computer program 1050. Referring to FIG. 10, the controller 1000 comprises a processor or processing circuitry 1002, and may comprise a memory 1004 and interfaces 1006. The processing circuitry 1002 is operable to perform some or all of the steps of the method 100 and/or 700 as discussed above with reference to FIGS. 1 and 7a and 7b. The memory 1004 may contain instructions executable by the processing circuitry 1002 such that the controller 1000 is operable to perform some or all of the steps of the method 100 and/or 700. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc.

Figure 11:
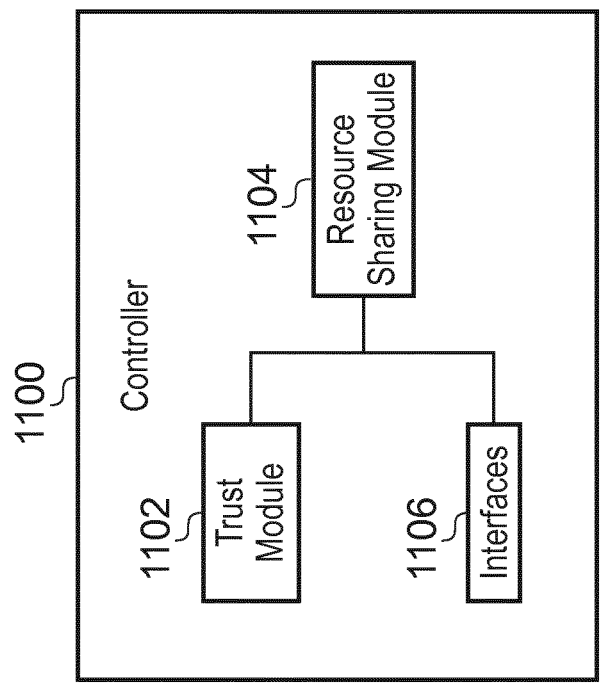
FIG. 11 is a block diagram illustrating functional modules in another example of controller.

FIG. 11 illustrates functional modules in another example of controller 1100 which may execute examples of the methods 100 and/or 700 of the present disclosure, for example according to computer readable instructions received from a computer program. It will be understood that the modules illustrated in FIG. 11 are functional modules, and may be realised in any appropriate combination of hardware and/or software. The modules may comprise one or more processors and may be integrated to any degree.

Referring to FIG. 11, the controller 1100 comprises a trust module 1102 for seeking to establish a trust relationship with a cooperating system hosted on a mobile entity. The controller 1100 further comprises a resource sharing module 1104 for initiating use of a resource provided by the cooperating system or initiating provision of a resource for use by the cooperating system. The controller 1100 may also comprise interfaces 1106.

Figures 12, 13:
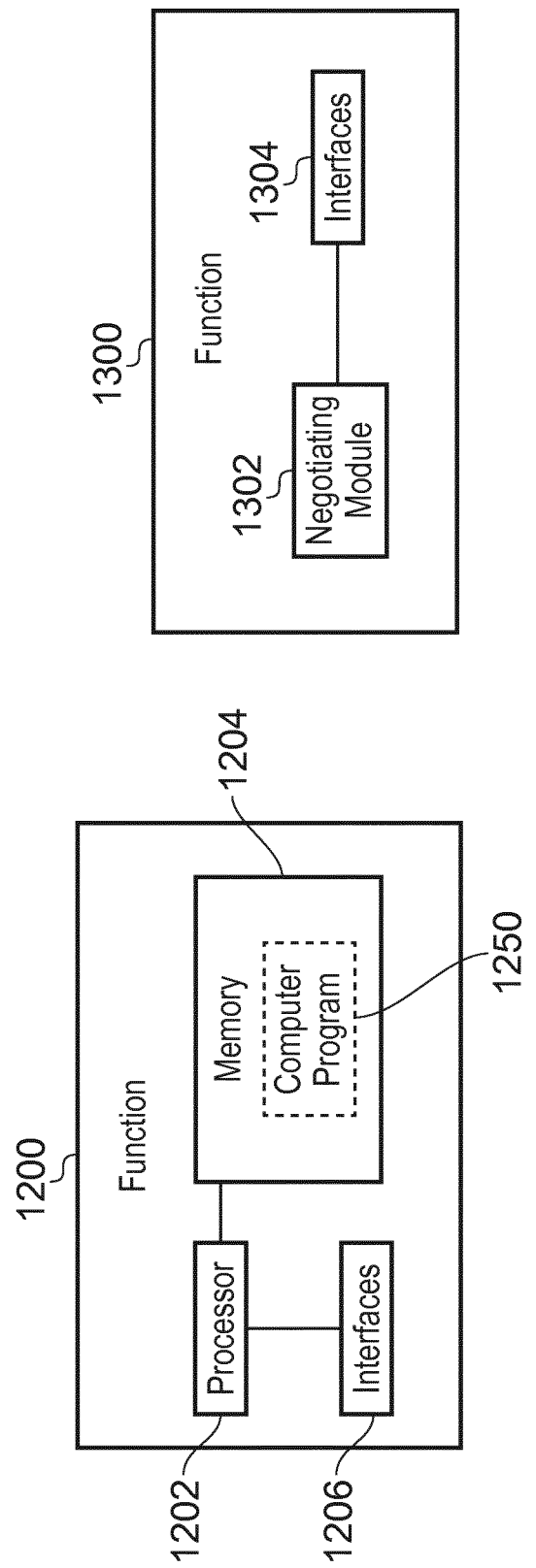
FIG. 12 is a block diagram illustrating functional modules in a digital representative function.
FIG. 13 is a block diagram illustrating functional modules in another example of digital representative function.

FIG. 12 is a block diagram illustrating an example function 1200 which may implement the method 200, 800 and/or 900 according to examples of the present disclosure, for example on receipt of suitable instructions from a computer program 1250. Referring to FIG. 12, the function 1200 comprises a processor or processing circuitry 1202, and may comprise a memory 1204 and interfaces 1206. The processing circuitry 1202 is operable to perform some or all of the steps of the method 200, 800 and/or 900 as discussed above with reference to FIGS. 2, 8a, 8b, 9a and 9b. The memory 1204 may contain instructions executable by the processing circuitry 1202 such that the function 1200 is operable to perform some or all of the steps of the method 200, 800 and/or 900. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

FIG. 13 illustrates functional modules in another example of function 1300 which may execute examples of the methods 200, 800 and/or 900 of the present disclosure, for example according to computer readable instructions received from a computer program. It will be understood that the modules illustrated in FIG. 13 are functional modules, and may be realised in any appropriate combination of hardware and/or software. The modules may comprise one or more processors and may be integrated to any degree.

Referring to FIG. 13, the function 1300 comprises a negotiating module 1302 for negotiating, with a digital representative of a cooperating system hosted on a mobile entity, at least one of provision of a resource to the system by the cooperating system, or provision of a resource to the cooperating system by the system. The function 1300 may also comprise interfaces 1304.

As illustrated by the above discussion, the present disclosure proposes methods according to examples of which digital contracts may form part of a decentralised trust system, for example based on blockchain, for sharing digital data and other resources among constrained mobile edge entities. Data sharing and related processing can be offloaded to the central cloud in the form of a digital representative and used for discovery of cooperating systems for resource sharing and preparation of such sharing among systems of mobile edge entities. If there is no network connectivity between a system and digital representative, a discovery process for cooperating systems may be proactively started in the system or its digital representative. The system and/or its digital representative may use predictive models and locally available data to predict resource requirements and prepare potential data and resource exchange. Once mobile entities with hosted systems arrive within a range at which such communication and data exchange becomes possible, systems can establish a prepared interaction and a system without network connectivity or another needed resource use a cooperating system to access that resource, for example sending data to a targeted cloud system via the cooperating system according to terms agreed in a digital contract. Such data and other resource exchange can also be used between different systems in the same entity, for example when such systems belongs to different vendors.

Further detail of different aspects of the above discussed methods is presented in additional detail below, followed by discussion of different use cases and implementation options for the different methods.

Data Collection

Mobile entity data, such as data collected by different sensors and internal systems, location and navigation data, inventory status data etc., is collected constantly in the systems of mobile edge entities. This data may be pushed to a vendor dependent central cloud as a "digital representative" whenever constrained connectivity resources allow, and then aggregated in the central cloud as required. Such collected data can also be very useful to other systems controlled by the same vendor and also to systems controlled by other vendors. In the case of limited connectivity, resources such data exchange can be interrupted or completely lost depending upon the nature of the constraints experienced by a particular system. Different implementations of the above discussed methods may address this problem, as illustrated by the two use cases discussed below.

Digital Data Exchange Use Cases

Two different use cases for the above discussed methods are now presented. Both use cases consider the provision of network connectivity to allow for data exchange with a cloud based function, although it will be appreciated that this is merely illustrative of one example of resource sharing that can be provided according to the present disclosure. The use cases are presented in the context of the transportation industry, with mobile entities in the form of shipping vessels. Again, this is merely an illustrative example of an industry sector in which methods according to the present disclosure may be implemented.

The first use cases concerns a situation in which sporadic limited connectivity is available between a system and its digital representative. In this use case, resource sharing is triggered with limited signal exchange between the entity system and digital representative. The second use case concerns a situation in which no network connectivity is available, and resource sharing is triggered by proactive prediction of the data exchange requirements using collected data. Both use cases envisage the use of smart contracts, a Trust Management System, and a transaction token exchange. All of these concepts are discussed in greater detail below.

Smart Contracts and Enabling Framework for Resource Sharing

Digital contracts as a decentralised trust system, including for example smart contract blockchain, can be used as an enabling framework for secure resource sharing. Hyperleger Fabric™, hosted by The Linux Foundation® is an example of such a system. Mobile entities, such as transportation systems, can enrol into a decentralised trust system and form an account with some metadata sharing short information on offered data and other resources sharing capabilities. The information may also include resource types, limitations etc. and also some sharing policy tags that can be useful in cooperating system discovery. Enrolment in the decentralised trust system can be per vendor, per mobile entity, or per system base or per any related combination of parameters. Enrolment membership can include entity identification, system identification, policies on data and other resource sharing, data and other resource types and many other fields that can be used in a smart contract discovery process. Once enrolled, mobile entities and their systems can discover among other members common interest on data and other resource sharing, and create smart contracts as a business framework enabling resource sharing over trusted channels.

Another possibility is that smart contracts may be implicit in a business relationship between partners. For example, if certain systems belong to the same vendor, there might be an implicit "contract" that any data can be relayed when required within the same vendor systems. A smart contract exists as a digital entity to enforce a trust relationship between different systems, and the nature of a smart contract can vary from a simple policy encoded on the systems to a more sophisticated trust management system for peer to peer systems, such as provided by ledgering technologies.

Smart Contract Establishment and Cooperating Systems Discovery

Smart contracts may be established according to business or operational need when one or several entities or systems hosted on such entities want to share data and/or other resources with other entities or systems, and seek to select preferred entities to collaborate with and to propose terms of a contract. Once a smart contract is established, contractors can use a private channel (e.g. blockchain or a central platform) to exchange more sensitive information including anchoring tokens when for example connectivity resources need to be shared. All related transactions are confirmed by involved contractors seamlessly in the background. The discovery process for identification of cooperating systems for resource sharing can be performed by a dedicated component in the digital representative which can use internal data and discovery policies to select preferable cooperating systems using the smart contract system. An example of query data, when establishing a contract or a transaction within a contract, can be transportation entities with compatible crossing routes and adequate capabilities, matching preferable business policies to a contract.

A discovery process can also be initiated by an entity or system when there is no available network connectivity. In such cases, a mobile entity can use local data on potential existing contract candidates to predict their availability on the entity's current route and to run resource sharing preparation. Similar processes/components can be run for targeted specific functions such as connectivity sharing, pathfinding data sharing, weather data sharing, etc.

Secure Tokens Exchange

A system (A) might not always have connectivity when it needs to send or receive some data. Examples of the present disclosure present a solution to provide help through other systems (B . . . Z) that have suitable capabilities for transferring the requested data. However, as the system (A) that needs the service cannot necessarily communicate directly with its digital representative, there is a need for establishing trust in the system (B) that will offer to provide the connectivity service.

Trust can be built on the trust that is already present between the system (A) and its digital representative. This could be in the form of the system (A) knowing the public key of its digital representative, or the system and digital representative sharing a shared secret. In either case, a security credential would typically be used for authenticating each other and establishing a secure connection between them. The digital representative can use the trust with the system to generate a secure transaction token, which the system (A) can authenticate as coming from the trusted digital representative. The token would indicate what type of service should be allowed between the two identified systems (A and B . . . Z) and any information relevant for exchanging data or other resource usage between the two. The token can be downloaded to the system (A) directly from its representative. However, if there is no connectivity, the token can be communicated to the system (A) with the help of the representatives of the cooperating systems (A and B . . . Z) using a decentralised trust system. In this case, the token would be sent from the system (A) digital representative to the cooperating system (B . . . Z) digital representative, and from there be sent to the cooperating system (B . . . Z), which in turn would provide the token to the system (A) when they are in communication range. In this case the digital representatives can use a private channel established under the digital contract (smart contract) for communicating the transaction token.

The transaction token could either be signed by the private key of the digital representative so that the system (A) can verify the signature, or it could be encrypted by the private key of the digital representative, by the public key of the system (A), or by the shared secret. There could also be a shared key based keyed hash, providing something similar to a digital signature. An advantage of only having a signature and not encrypting the token is that the cooperating systems (B . . . Z) could also inspect the token and identify what the system (A) is authorised to do. It would then be sufficient that the cooperating systems (B . . . Z) get the token from their respective digital representative, which they trust. If the token is encrypted, and thus not readable by the cooperating systems (B . . . Z), their representative would have to provide them with the relevant information about the content of the token, i.e. what type of service to provide to the system (A) etc. so that the cooperating system (B . . . Z) knows what it is allowed/supposed to do. Alternatively, the system (a) could provide a decrypted token to the cooperating systems (B . . . Z), which token should be accompanied by a corresponding digital signature from the digital representatives of the cooperating systems.

The token may contain some freshness parameter, to protect against replay attacks. In addition, or instead, it would typically be beneficial to have a lifetime included in the token so that the system discards old/expired tokens. The token or tokens, which may include one token per cooperating system or one token for all cooperating systems, could contain some or all of the following information:

- Information about what resources should be shared with the other system (B . . . Z) (for example connectivity (upload or download message exchange), data, data storage capacity, processing capacity, other);
- Information about which other systems are trusted to handle resource sharing (for example identities that the system can authenticate, either on its own or by including credentials of the other systems in the token);
- Other policies regarding information transfer between the two (or more) systems;
- The authenticatable identity (for example certificate or public key) of the system (A), allowing cooperating systems to authenticate the system (A) and thus know they are serving the correct system.

The authenticatable identity of system (A) could also be provided to the cooperating systems (B . . . Z) from their digital representatives separately from the token.

The system (A) may be pre-provisioned with credentials (for example certificates) of other trusted systems (B . . . Z), or fleets of systems, in a similar manner to that with which web browsers come pre-provisioned with certificates of trusted certificate authorities. This could include both systems of the same fleet as the system, or also of other fleets.

The token or tokens generated by the digital representative of the system (A) can be provided either to the system (A) or to cooperating systems (B . . . Z) that could help the system (A) with its resource requirements. Direct provision to the system (A) may be appropriate when the system (A) has at least limited connectivity (as illustrated in the message flow of FIG. 16), while provision to cooperating systems may be appropriate when the system (A) is without connectivity (as illustrated in the message flow of FIG. 19). If the token is provided to the system (A), it may be beneficial to have the token(s) signed also by the representative of the cooperating systems (B . . . Z) so that the systems can verify that their digital representatives have agreed to the content of the token. Alternatively, the systems (B . . . Z) may seek to verify the token(s) with their digital representatives once they receive them from the system (A). The digital representative of a cooperating system (B . . . Z) may alternatively, following negotiations with the digital representative of system (A), provide its own system (B . . . Z) with the necessary information about the system (A) needing support.

When the system (A) and at least one cooperating system (B) can communicate, they can first mutually authenticate based on information found in the token, or otherwise available to them (for example pre-provisioned certificates of trusted peers). The system (either the system (A) or the cooperating system (B)) that has been provided with a transaction token by its digital representative can then, based on the mutual authentication, determine that the system with which it is communicating is the system specified by the token. The system with the token can then provide the token to the system with which it is communicating, allowing that system to verify the token by checking that the token has been signed by its trusted digital representative. A system provided with a transaction token may thus effectively scan for peers with identities found in the token, and, on locating such an identity, may mutually authenticate and then share the token. Following verification of the token by both systems, appropriate resource sharing can be performed between the systems on the basis of the token contents, including data exchange, storage, processing message sending/receipt, or other resource sharing.

Use Case with Sporadic Limited Connectivity

Figure 14:
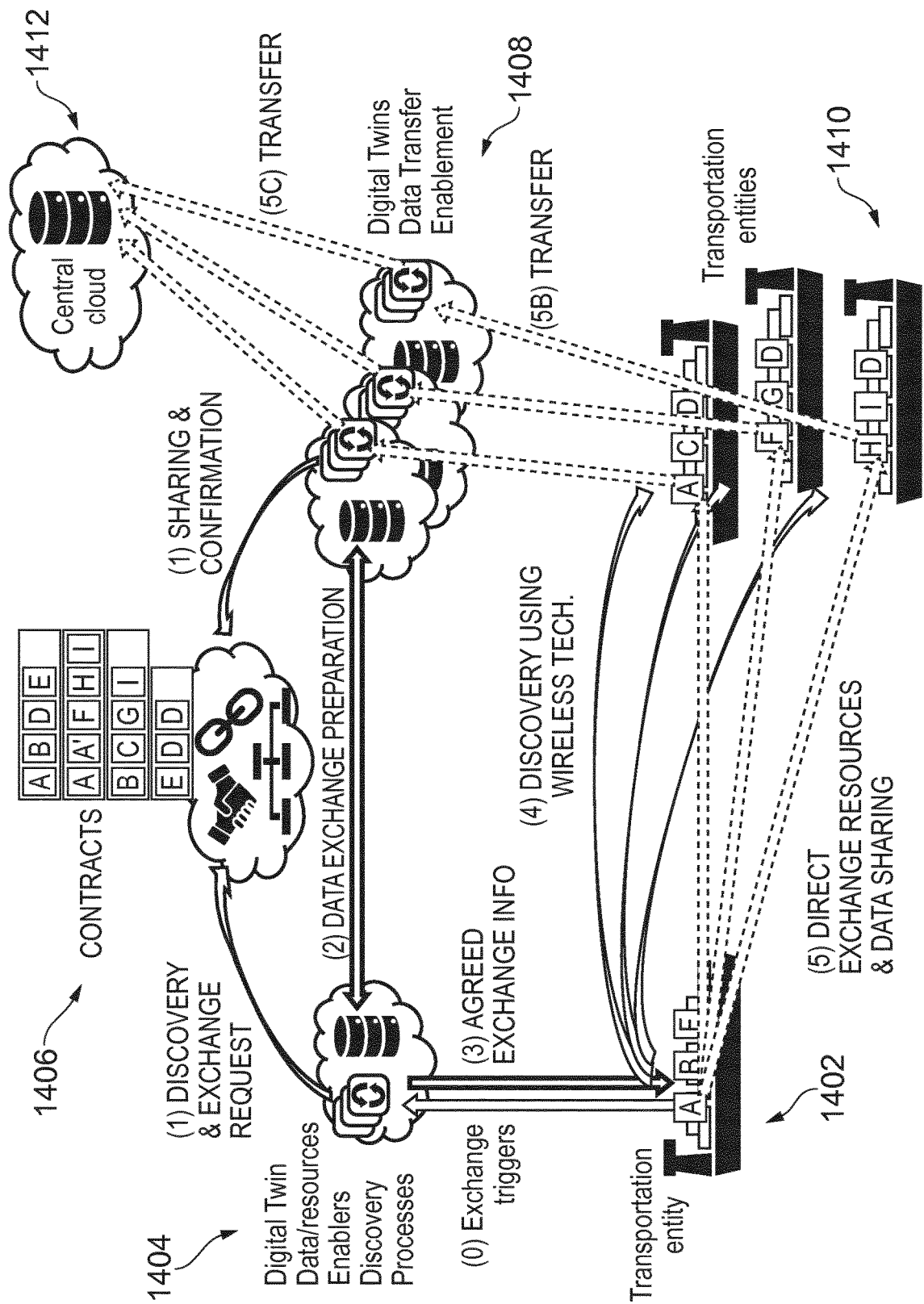
FIG. 14 is a schematic illustration of a resource sharing use case.
Figure 15:
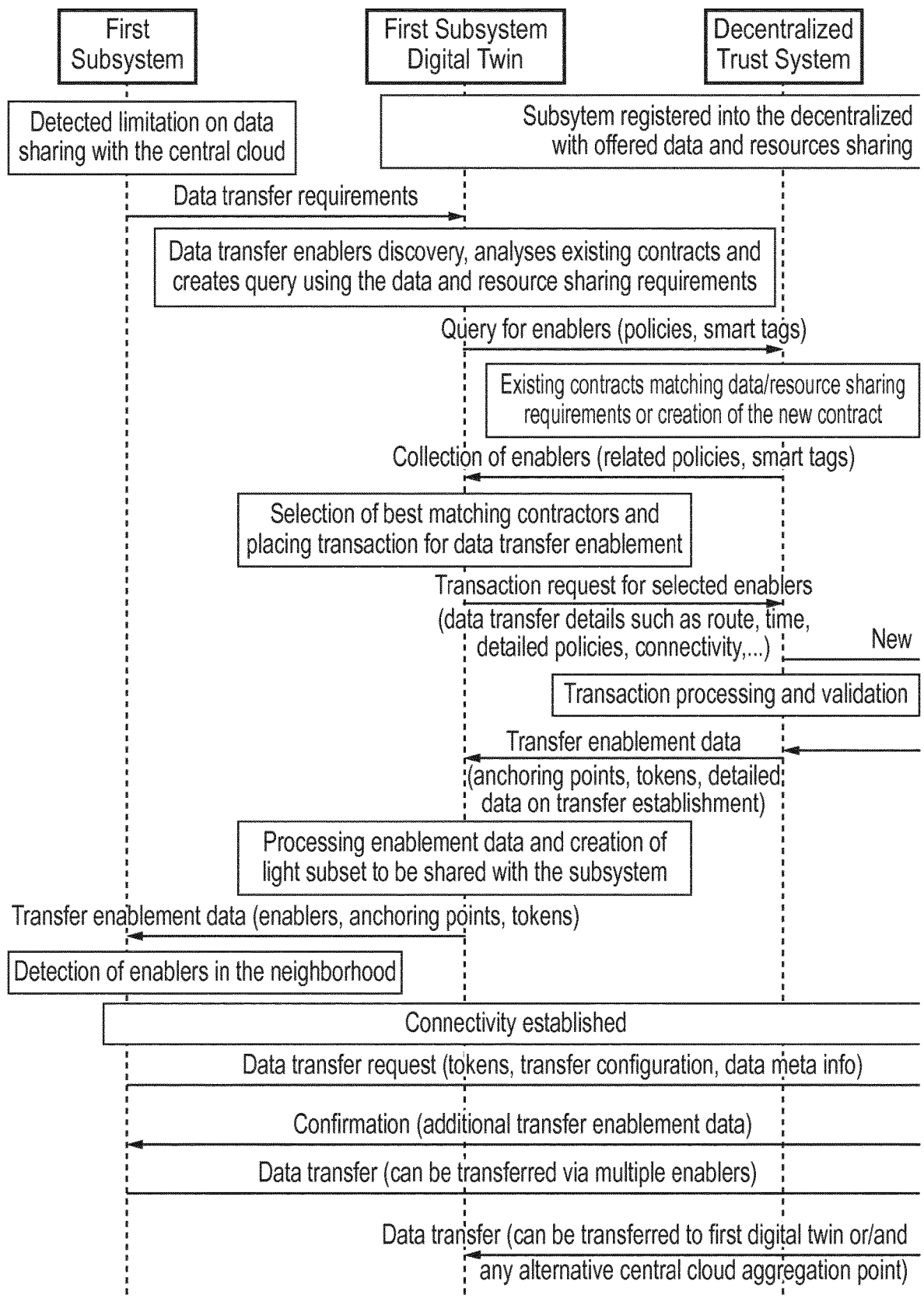
FIG. 15 illustrates message flow for the use case of FIG. 14.
Figure 15:
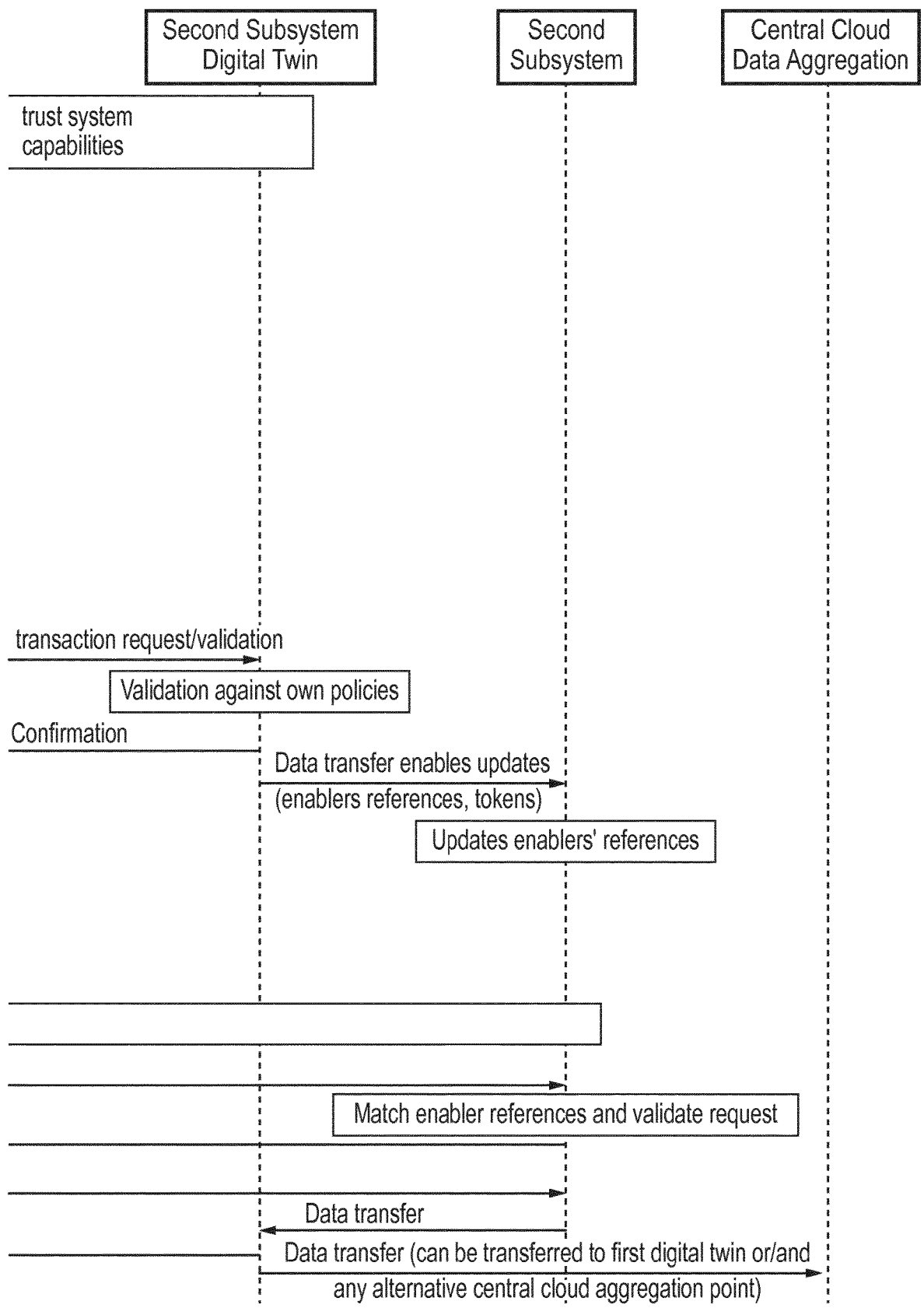
Figure 16:
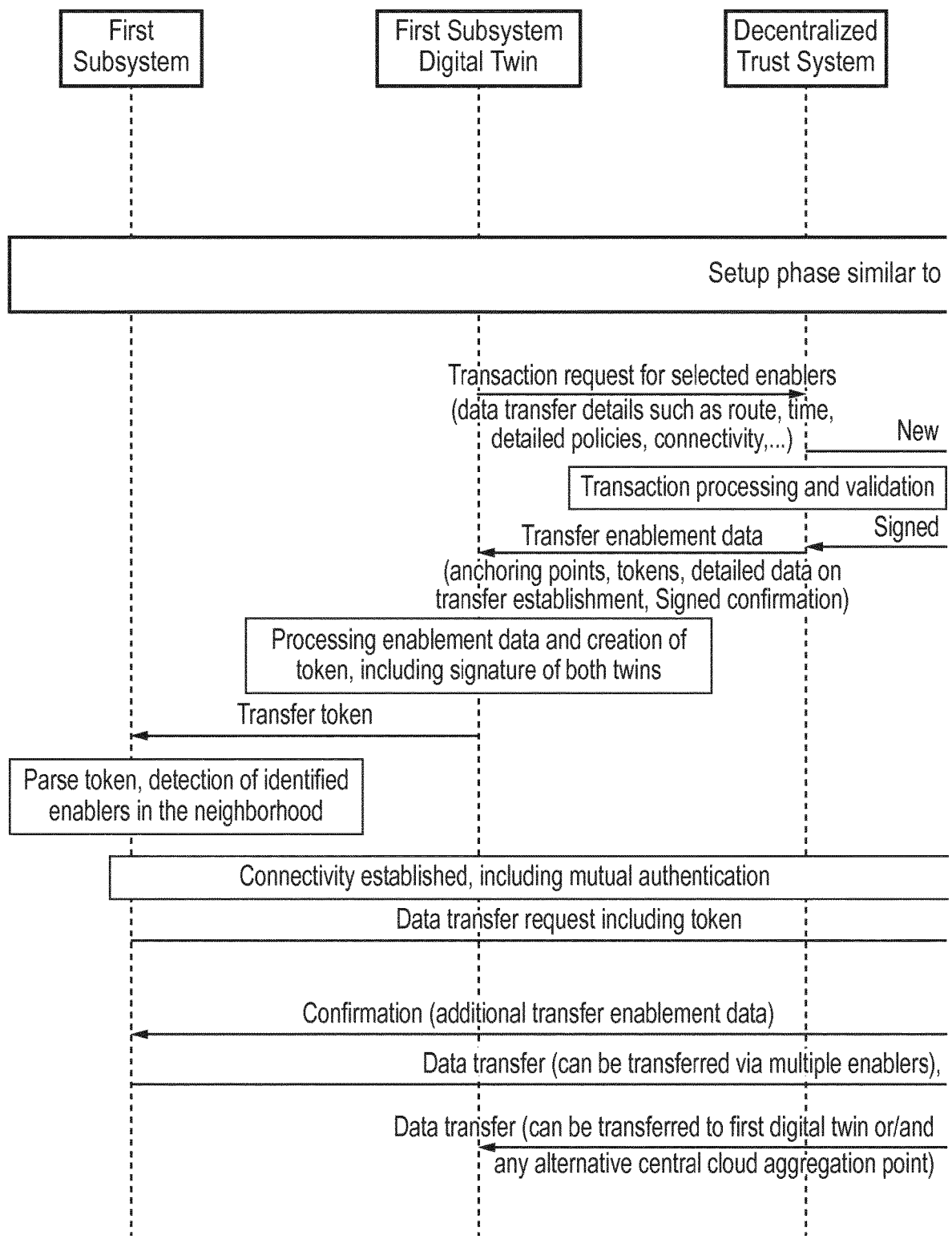
FIG. 16 illustrates another example of message flow for the use case of FIG. 14.
Figure 16:
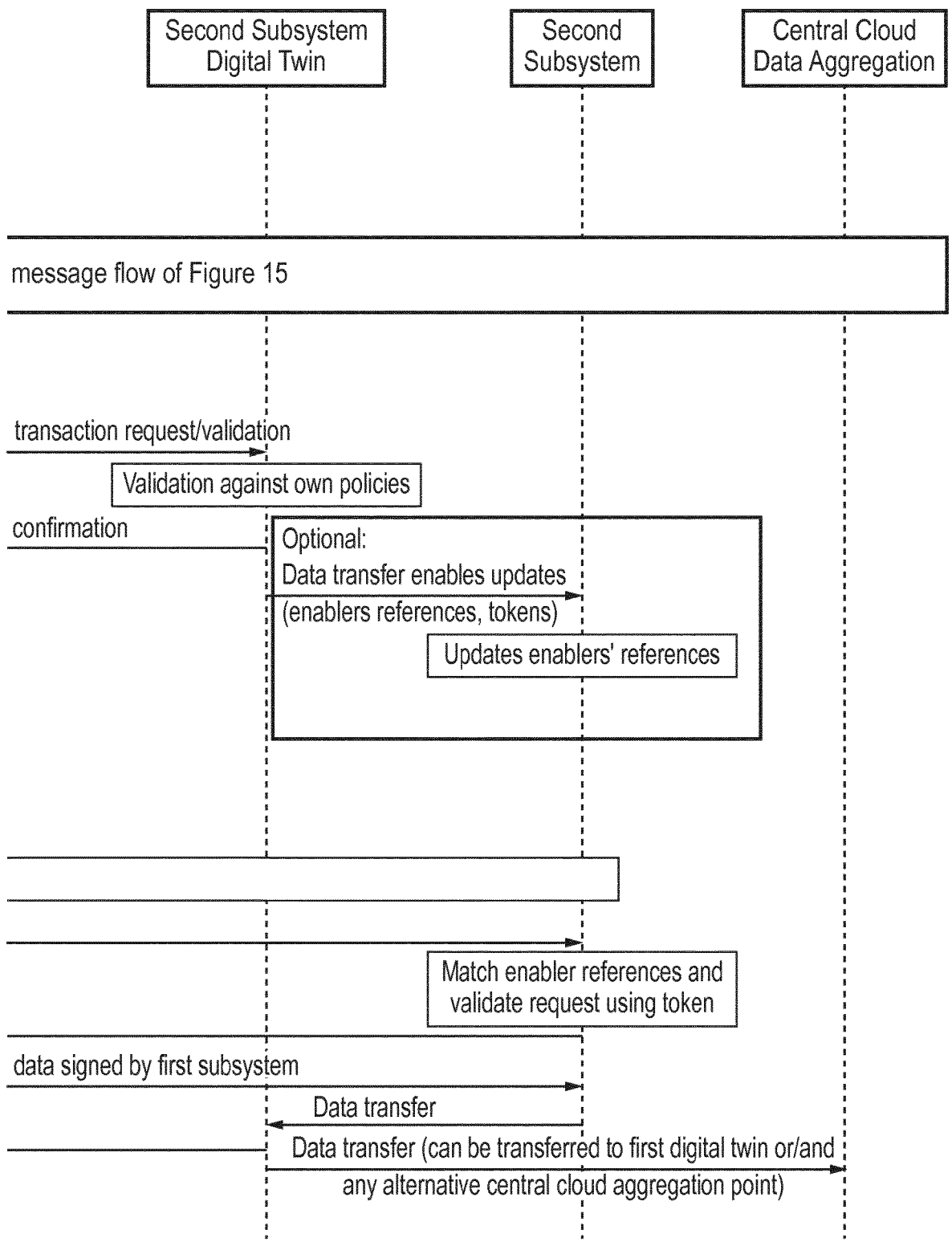

This use case is depicted in FIGS. 14, 15 and 16. This use case may be applicable to situations in which the system has out of the ordinary data exchange needs that the digital representative cannot predict on the basis of the data available to it and prediction algorithms based on usual operational requirements. FIG. 14 is a schematic illustration of the steps conducted by the various different actors, and FIGS. 15 and 16 illustrate message flow, in a case in which a transaction token is not used (FIG. 15) and in a case in which a transaction token is used FIG. 16).

The following discussion of steps refers to the steps as illustrated in FIG. 14, which steps can be mapped both to the flow charts of FIGS. 7, 8 and 9 and to the message flow of FIGS. 15 and 16.

Step 0: Data Exchange Discovery Triggers

For various reasons, local resources such as connectivity in a constrained edge entity can be very limited, and insufficient for data exchange. However, systems such as system 1402 on a mobile entity need to be synchronised with the central cloud and be updated on any transport related or other conditions in order to perform in an optimal manner. A data transfer initiator system therefore needs to discover potential data resources and services to be shared with a cooperating system belonging to the same mobile entity or a different mobile entity.

Step 1: Data Discovery

The system 1402 starts a discovery procedure by placing a request firstly to its own digital representative 1404 (illustrated in the Figure as a "digital twin) in the central cloud using a very light request over the limited connectivity. The digital representative 1404 starts a discovery process in the decentralised trust system 1406 of available data exchange targets (potential cooperating systems) considering its own collected data as an input. A pre-request is that potential cooperating systems have been enrolled into the decentralised trust system. In a first level, the discovery process checks existing smart contracts and contractors data on the potential cooperating systems. If there is no matching smart contract, the discovery process can also trigger a new contract targeting discovered members of a decentralised trust system. Once a valid contract is established or detected any related transactions can start.

Step 2: Data/Resource Exchange Preparation

Once the first digital representative has selected a targeted cooperating system or systems, it starts related transactions via a private channel to exchange shared data with the digital representative(s) 1408 of the target cooperating system(s). Data shared among contracted digital representatives can include collected data from used systems, location, route learnings etc. It can also include data on the system such as ID, available communication channels and related services, sensors, and other related information.

The digital representative 1402 uses shared data to increase its knowledge on transportation routines and agree on potential direct exchange of data and other resources between corresponding systems. Such direct exchange preparation can include IDs, security tokens and resources/ services anchoring points. There might be multiple receivers of data where connectivity channels can be shared at the same time or in a sequence according to predicted availability. The digital representative 1404 generates a digital token(s) for the targeted cooperating system, as discussed above.

Step 3: Pushing Discovered Communication Instructions for Exchange

Only a light subset of shared data is pushed back to the system 1402 when connectivity constrains allows this. The data can be in the form a token(s) as discussed in above and illustrated in FIG. 16. The subset of data enables smooth direct communication anchoring between contracted systems once they get into the required proximity range. Data pushed to the system can include a list of targeted cooperating systems with their identification and communication channel anchoring information such as security data and access points. The system can use exchanged data to prepare in advance anchoring to the cooperating systems and data transfer activities.

Step 4: Physical Discovery of Cooperating System(s)

The system 1402 uses existing wireless technologies to discover available systems 1410 in in its vicinity. Once the system 1402 detects a targeted cooperating system 1410 it triggers communication using prepared communication establishment data. At this stage it can also provide the token, which the target cooperating system 1410 can use to verify the service exchange, unless it has received the relevant information directly from its digital representative. After this, the system 1402 can exchange targeted data and it can also use agreed services/resources from the cooperating system 1410.

Step 5: Data Transfer

Data is transferred via the cooperating system 1410 and its digital representative 1408 to an agreed destination point in the central cloud. The destination point may be the system digital representative 1404 and/or any alterative data aggregation point in the central cloud 1412. Such data transfer is registered as a blockchain transaction and confirmed by involved contractors. Data transfer can also be executed with delay if the cooperating system 1410 does not have network connectivity at the time of data transfer from the system 1402. The system 1410 may regain network connectivity before the system 1402, so ensuring the data is received in the cloud earlier than would have been the case if the system 1402 had waited until connectivity was restored. In some examples, the system 1402 may exchange data with more than one cooperating system 1410 in parallel, for example so as to increase total bandwidth available to the system 1402 when possible. Use of resources provided by more than one cooperating system 1410 may be indicated or specified in a negotiated transaction.

Use Case with No Connectivity

Figure 17:
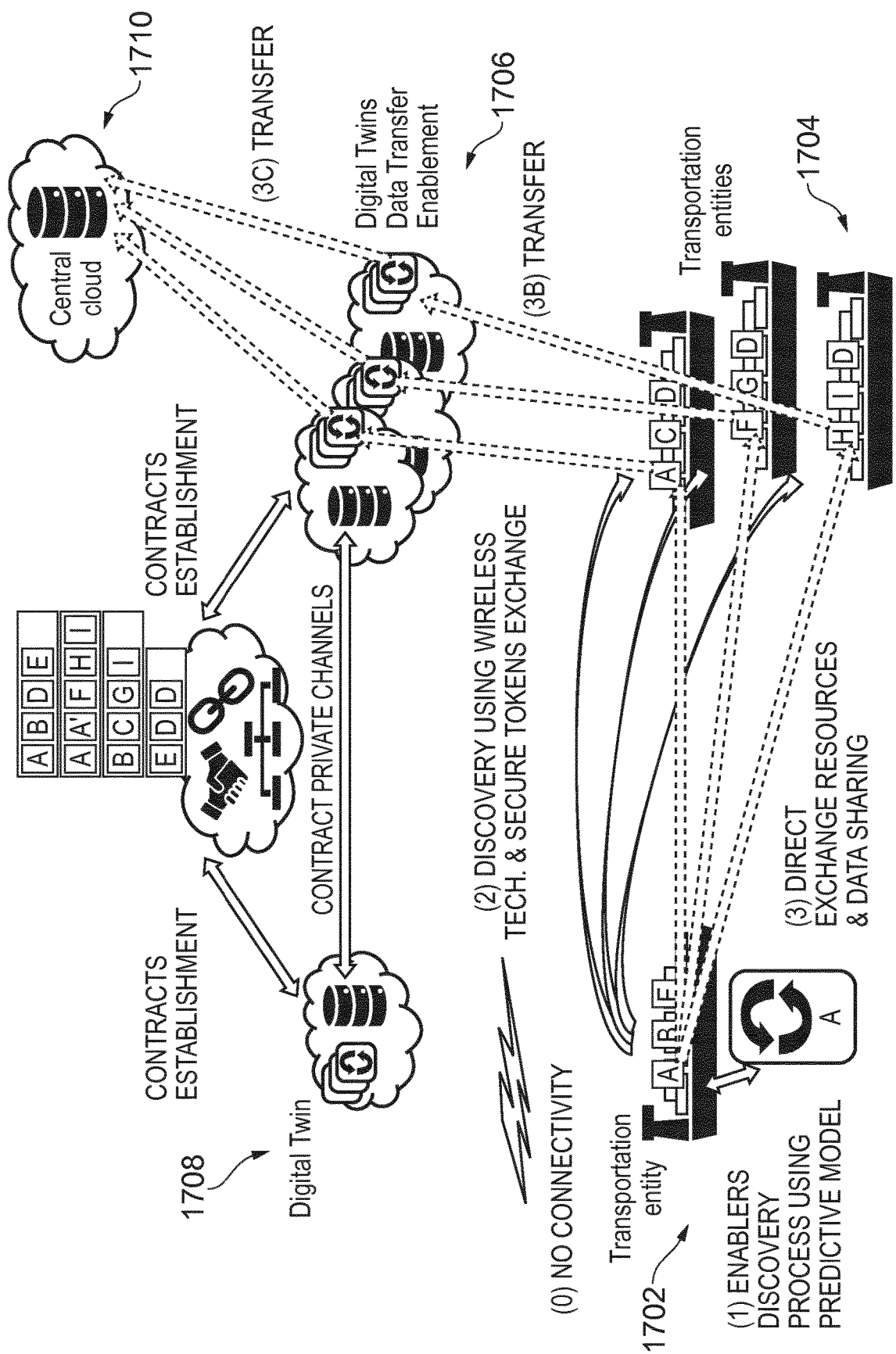
FIG. 17 is a schematic illustration of another example of resource sharing use case.
Figure 18:
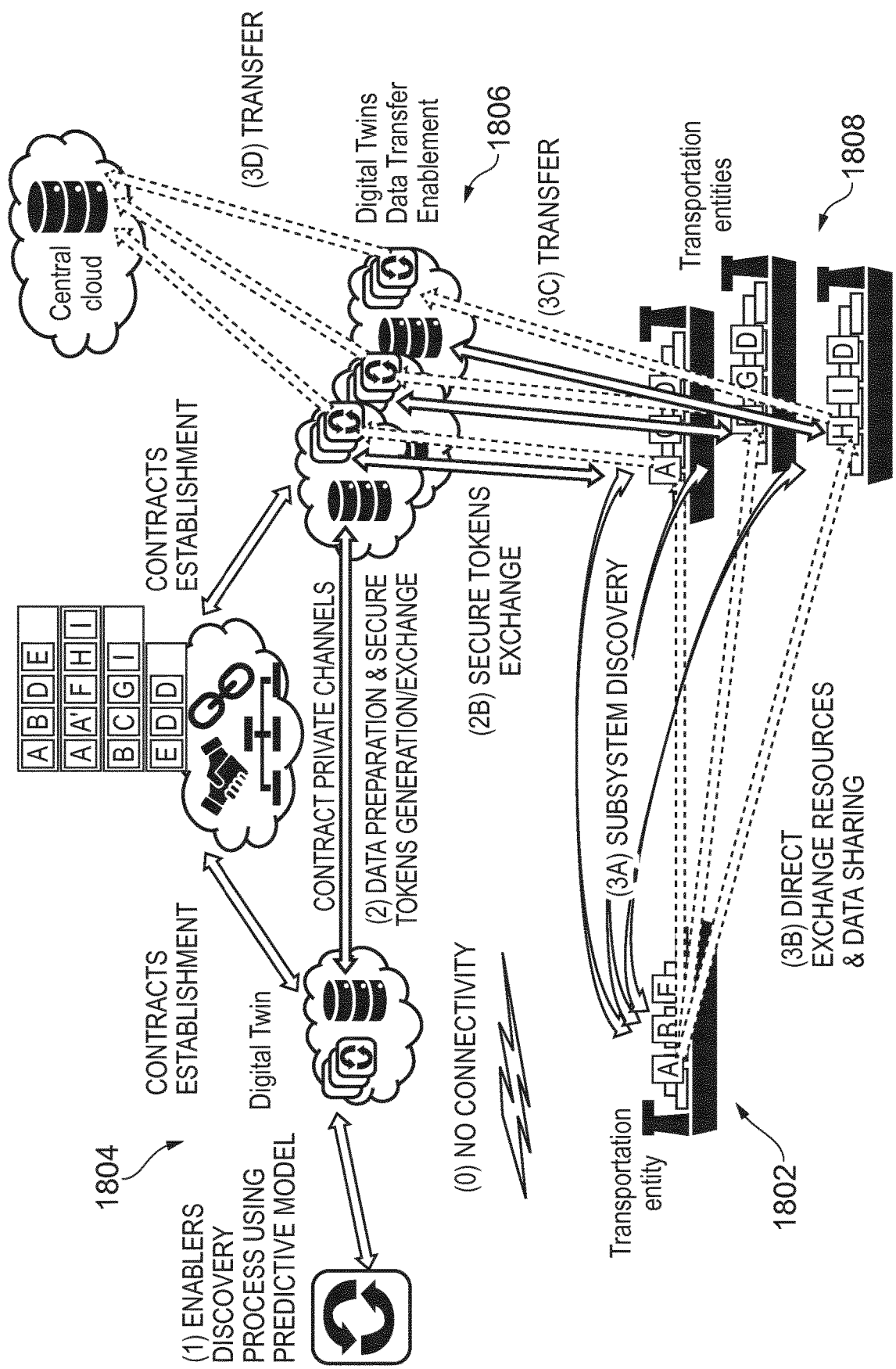
FIG. 18 is a schematic illustration of another example of resource sharing use case.
Figure 19:
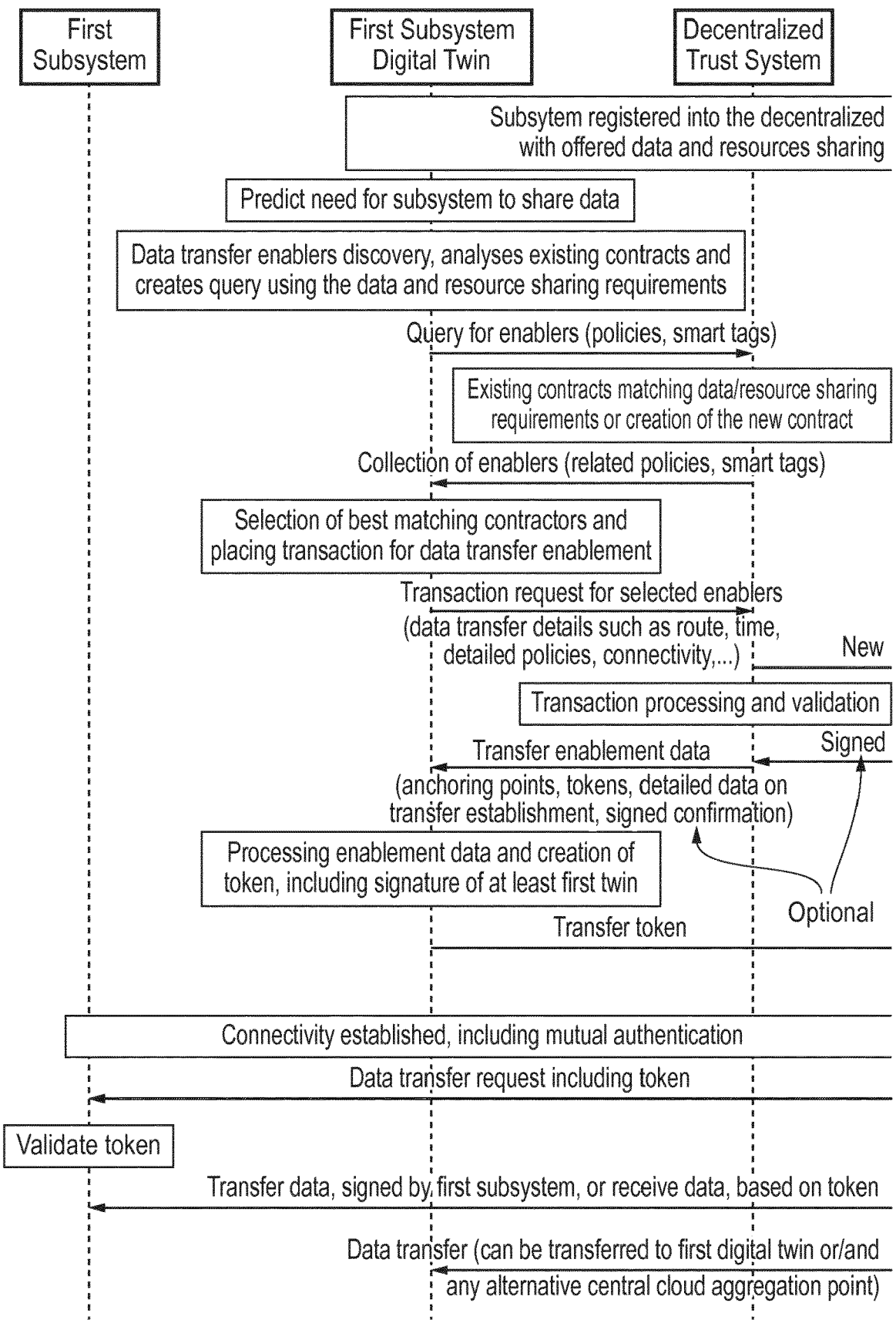
FIG. 19 illustrates message flow for the use case of FIG. 18.
Figure 19:
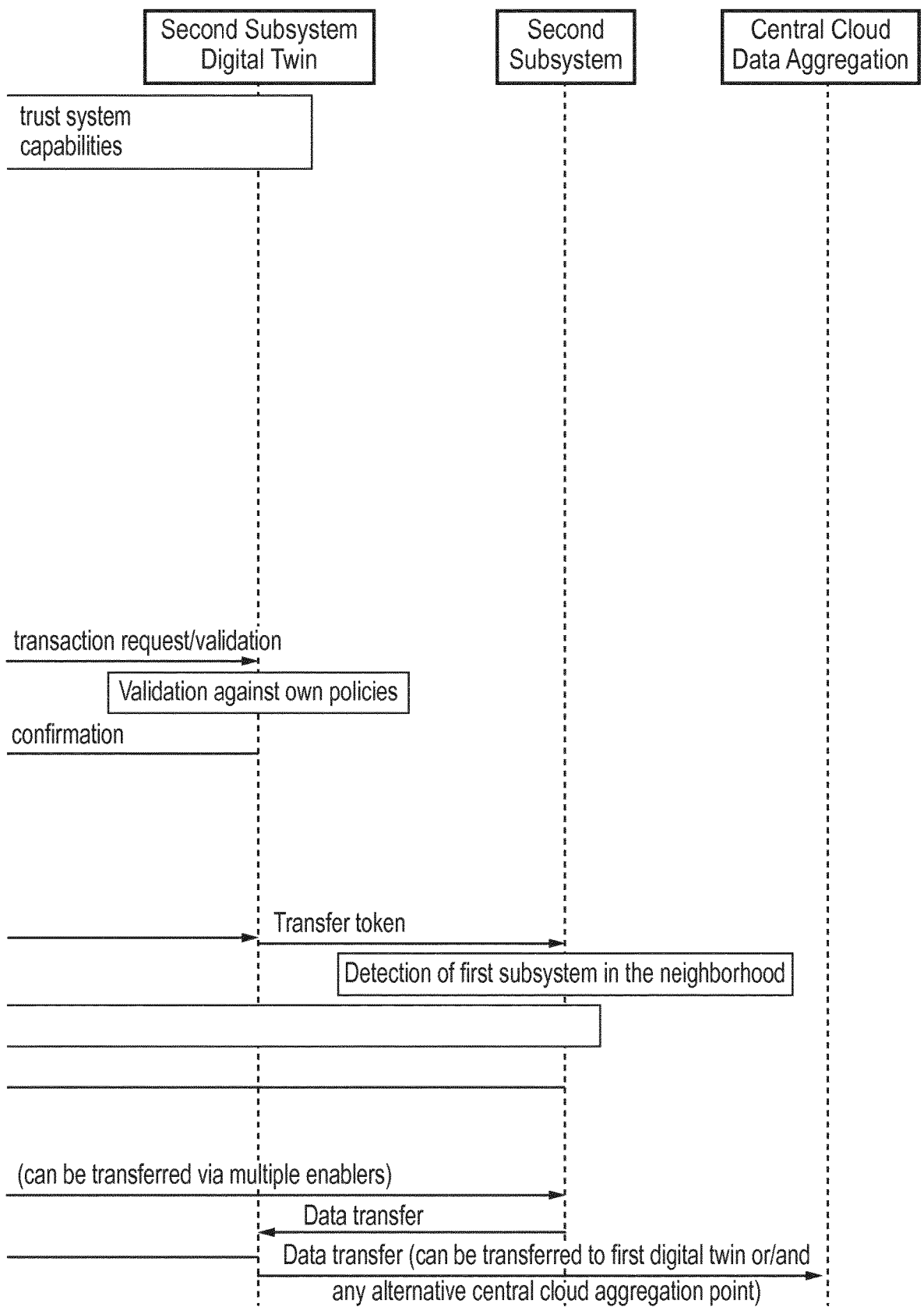

This use case is depicted in FIGS. 17, 18 and 19. This use case may be applicable to situations in which either the system or its digital representative knows that the system will likely be needing some specific type of data exchange service in the future, when there might not be connectivity, and thus the system or digital representative can proactively prepare for it. Thus, the digital representative can provide tokens (as discussed above) in advance to the system. FIG. 17 illustrates no connectivity with discovery performed by the system, and FIG. 18 illustrates no connectivity with discovery performed by the digital representative. FIG. 19 illustrates message flow according to the situation of FIG. 18. The following steps are illustrated in FIG. 17, and may be mapped to the flow charts of FIGS. 7 to 9.

Step 0: Data Exchange Discovery Triggers

Owing to resource limitations in a constrained mobile edge entity, data transfer and synchronisation of data with the central cloud can be disabled. Such a situation may be caused for example by a lack of connectivity resources. However, systems need to be synchronised with the backend cloud and updated on any transport or other conditions in order to perform in an optimal manner. A system 1702 may therefore seek to discover potential cooperating systems for resource exchange in the form of data transfer, even in a situation without any connectivity to the network. The system 1702 can analyse the latest available local data on potential cooperating systems and predict their availability. A cooperating system may be hosted on an external mobile entity that will cross paths with the entity of the system 1702, or may be hosted on the same mobile entity.

Step 1: Prediction of Cooperating System Availability

The system 1702 uses locally collected data on potential cooperating systems and runs an availability prediction model to select optimal candidates for enabling data transfer. Collected local data can include historical data on potential cooperating systems on the path of the mobile entity, related capabilities and resource availability, even digital contract dependencies and preferences. The system 1702 may also have data related to its own digital representative and contract dependencies. For example the system 1702 may have locally stored security data such as tokens needed in authorisation negotiation or a list of trusted entities. Once the best matching cooperating systems are selected, the system 1702 can use related data to prepare anchoring with the cooperating systems and prepare data transfer in advance.

Step 2: Cooperating System Discovery and Exchange Authorisation

The system 1702 uses existing wireless technologies to discover available cooperating systems 1704 its vicinity. Once the system 1702 detects targeted cooperating systems 1704 it triggers communication using prepared communication establishment data, such as a token as discussed above. Both the system 1702 and cooperating systems 1704 can verify that the specific data transfer is acceptable, either directly from the token, or in combination with other information and policies provided in advance to the systems from their respective representatives 1706, 1708. In some examples, such as when a transaction has been established in advance, the cooperating systems may contact their digital representatives 1708 to confirm the transaction, and so verify the data transfer.

Step 3: Data Transfer

Data is transferred from the system 1702 to the cooperating system(s) 1704, and via the cooperating system(s) 1704 and their digital representative(s) 1706 to the agreed destination point in the central cloud. The destination point can be the system digital representative 1708 and/or any alterative data aggregation point in the central cloud 1710. Such data transfer is registered as blockchain transaction and confirmed by involved contractors. Data transfer can also be executed with delay if the cooperating system(s) 1704 do not have network connectivity at the time of data transfer from the system 1702. The cooperating system(s) 1704 may regain network connectivity before the system 1702, so ensuring the data is received in the cloud earlier than would have been the case if the system 1702 had waited until connectivity was restored.

Proactive Prediction of the Data Exchange Needs in the Digital Representative

This is a variation of the above use case in which the digital representative anticipates connectivity needs of the system. This variation of the use case may be applicable when there is no connectivity to the system, but the digital representative knows that the system likely needs some specific type of data exchange service, and thus the representative proactively prepares for it. The representative could also perform similar proactive preparatory steps if the system has connectivity but is expected to lose connectivity at a future time when data transfer will be needed, or if the connectivity is insufficient for direct data transfer to/from the system. In this example use case variation, the digital representative can provide tokens (as discussed above) in advance to the system. This use case variation is depicted in FIG. 18 and the message flow is illustrated in FIG. 19. The steps performed are discussed below with reference to FIG. 18 but can be mapped to the flow charts of FIGS. 7 to 9 and the message flow of FIG. 19. As can be seen in FIG. 19, having the digital representative of a cooperating system sign the confirmation/content of the token is optional, as the cooperating system will receive the token from its own digital representative, which it trusts so ensuring it may trust the content of the token implicitly.

Step 0: Data Exchange Discovery Triggers

As in the first use case, the digital representative 1804 of a system 1802 seeks to identify suitable cooperating systems on the basis of a predicted need for resource such as data transfer, and negotiates the data exchange with the digital representative(s) 1806 of such systems.

Step 1: Preparation for Data Exchange

The digital representative 1804, together with the digital representative(s) 1806 of identified cooperating systems 1808, generates a token specifying the data exchange policy, as discussed above. The token is communicated to the digital representative(s) 1806 of the cooperating systems 1808 using a private channel established under the digital contract (smart contract).

Step 2: Preparation of Cooperating Systems

The digital representative(s) 1806 of the cooperating system(s) 1808 provide the token, and potentially other related information, to their system(s).

Step 3: Data Exchange

At least one of the cooperating system(s) 1808 encounters the system 1802 for which it holds a token and initiates a mutually authenticated communication session with the system 1802. The token is exchanged and the system 1802 validates it. Based on the contents of the token the two systems exchange data and/or services in accordance with what was agreed between the two digital representatives 1804, 1806.

As demonstrated by the above discussion of FIGS. 1 to 19, aspects and examples of the present disclosure provide methods that facilitate the sharing of resources between systems hosted on mobile entities. This sharing may be purely opportunistic, based on a trust relationship established using configured policies and security credentials, or may be negotiated by digital representatives, for example using a decentralised trust management system encompassing smart contracts. The different examples of the present disclosure offer a means for the secure sharing of data and other resources across constrained mobile entities provided by potentially different vendors. Data processing and learning processes may be offloaded to the cloud, in the mobile constrained edge cloud, in the form of digital representatives with such digital representatives providing discovery of optimisation data and supplementary resources, including for example connectivity in constrained conditions.

Several different proposals for establishing resource sharing are presented, including in circumstances in which sporadic network connectivity is available, with systems proactively predicting and/or detecting connectivity problems and triggering via a digital representative alternative resource provision discovery. Other proposals concern resource sharing when no network connectivity is available, with systems or digital representatives, using available contracted data to predict resource requirements and pre-arranges data exchange with suitable cooperating systems. Rich data analytics and machine learning loops may be established by reusing smart contract shared data, and mobile and aggregated systems may be optimised even in situations of considerable heterogeneity of system vendors. Examples of the present disclosure enable autonomous transportation with dedicated cloud processes which close resource gaps caused by mobile entities' resource limitations.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for operating a system hosted on a mobile entity, wherein the system is operable to connect to a communication network, the method comprising:

a digital representative of the system negotiating a transaction with a digital representative of a cooperating system;

a controller of the system seeking to establish a trust relationship the cooperating system hosted on a mobile entity; and as a result of establishing a trust relationship with the cooperating system, the controller of the system performing at least one of:

initiating use of a resource provided by the cooperating system in accordance with the transaction negotiated by the respective digital representatives of the system and the cooperating system; or initiating provision of a resource for use by the cooperating system in accordance with the transaction negotiated by the respective digital representatives of the system and the cooperating system.

2. The method of claim 1, wherein the resource provided by the cooperating system or the system comprises at least one of:
- data;
- communication network connection bandwidth;
- processing capacity;
- data storage;
- functionality of the mobile entity on which the cooperating system is hosted.

3. The method of claim 1, wherein the system and cooperating system are hosted on at least one of:
- the same mobile entity;
- different mobile entities.

4. The method of claim 1, wherein seeking to establish a trust relationship with a cooperating system hosted on a mobile entity comprises:
- obtaining at least one of an identity of the cooperating system or a security credential of the cooperating system; and
- verifying the obtained identity or security credential.

5. The method of claim 4, wherein seeking to establish a trust relationship with a cooperating system hosted on a mobile entity further comprises:
- providing an identity of the system or a security credential of the system to the cooperating system.

6. The method of claim 4, wherein verifying the obtained identity or security credential comprises:
- requesting verification of the obtained identity or security credential from a digital representative of the system; and
- receiving a verification response from the digital representative.

7. The method of claim 4, wherein verifying the obtained identity or security credential comprises:
- authenticating the obtained identity or security credential; and
- comparing the obtained identity or security credential to an identity or security credential specified in a transaction token;
- and wherein a transaction token comprises a specification of resource usage identifying at least:
- the system;
- a cooperating system; and
- resources provided by the cooperating system that may be used by the system or resources available to the system that may be provided to the cooperating system.

8. The method of claim 7, wherein the transaction token further comprises a freshness parameter, and wherein seeking to establish a trust relationship with a cooperating system hosted on a mobile entity further comprises verifying the freshness parameter.

9. The method of claim 7, further comprising:
- receiving at least one transaction token; and
- verifying the received transaction token.

10. The method of claim 9, wherein verifying the received transaction token comprises as least one of:
- confirming that the received transaction token has been received over a communication channel established between the system and a digital representative of the system;
- verifying that the received transaction token has been authorised by a digital representative of the system.

11. The method of claim 10, wherein verifying that the received transaction token has been authorised by a digital representative of the system comprises at least one of:
- decrypting the received transaction token using a security credential associated with the digital representative of the system;
- confirming that the received transaction token has been signed by a security credential associated with the digital representative of the system.

12. The method of claim 1, further comprising:
- detecting the presence of the cooperating system; and
- establishing connectivity with the cooperating system.

13. The method of claim 1, further comprising sending a resource usage request to the cooperating system on establishment of a trust relationship.

14. The method of claim 13, further comprising including with the resource usage request a transaction token in which the cooperating system is identified.

15. The method of claim 1, further comprising:
- prior to the digital representative of the system negotiating the transaction with the digital representative of a cooperating system, the digital representative of the system receiving data from the controller of the system;
- the digital representative of the system using the data received from the controller of the system to determine whether resource sharing is required; and
- as a result of determining that resource sharing is required, performing a discovery process for discovering the cooperating system, wherein
- the digital representative of the system negotiates the transaction with the digital representative of the cooperating system after discovering the cooperating system.

16. The method of claim 15, wherein the digital representative of the system negotiates the transaction with the digital representative of the cooperating system using an existing smart contract held in a distributed storage.

17. The method of claim 15, wherein the method further comprises:
- the digital representative of the system providing to the controller of the system information about the negotiated transaction; and
- the controller of the system providing the information about the negotiated transaction to the cooperating system.

18. A controller for a system hosted on a mobile entity, wherein the system is operable to connect to a communication network, the controller comprising a processor and a memory, the memory containing instructions executable by the processor such that the controller is configured to:
- seek to establish a trust relationship with a cooperating system hosted on a mobile entity; and
- if a trust relationship with the cooperating system is established, perform at least one of:
- initiating use of a resource provided by the cooperating system in accordance with a transaction negotiated between a digital representative of the system and a digital representative of the cooperating system; or
- initiating provision of a resource for use by the cooperating system in accordance with the transaction negotiated between the digital representative of the system and the digital representative of the cooperating system.

* * * * *